(12) United States Patent
Ito et al.

(10) Patent No.: US 9,297,546 B2
(45) Date of Patent: Mar. 29, 2016

(54) HUMIDITY CONTROL APPARATUS AND AIR-CONDITIONING SYSTEM

(75) Inventors: Shinichi Ito, Tokyo (JP); Masaki Toyoshima, Tokyo (JP); Fumitake Unezaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 245 days.

(21) Appl. No.: 14/234,765

(22) PCT Filed: Jul. 27, 2011

(86) PCT No.: PCT/JP2011/004238
§ 371 (c)(1),
(2), (4) Date: Jan. 24, 2014

(87) PCT Pub. No.: WO2013/014708
PCT Pub. Date: Jan. 31, 2013

(65) Prior Publication Data
US 2014/0157806 A1    Jun. 12, 2014

(51) Int. Cl.
| | |
|---|---|
| F25D 17/06 | (2006.01) |
| F24F 11/00 | (2006.01) |
| F24F 3/14 | (2006.01) |
| B01D 53/26 | (2006.01) |
| B01D 53/04 | (2006.01) |

(52) U.S. Cl.
CPC .......... *F24F 11/0008* (2013.01); *B01D 53/265* (2013.01); *F24F 3/1411* (2013.01); *F24F 3/1429* (2013.01); *F24F 11/0086* (2013.01); *B01D 53/0454* (2013.01); *F24F 11/0015* (2013.01)

(58) Field of Classification Search
CPC  F24F 2003/144; F24F 3/1417; F24F 11/0015
USPC .................... 62/92, 94, 158, 176.6; 236/44 A
See application file for complete search history.

(56) References Cited

U.S. PATENT DOCUMENTS

| | | |
|---|---|---|
| 3,359,706 A | 12/1967 | Zankey |
| 4,719,761 A | 1/1988 | Cromer |

(Continued)

FOREIGN PATENT DOCUMENTS

| | | |
|---|---|---|
| EP | 2647416 A1 | 10/2013 |
| JP | 48-20993 | 6/1973 |

(Continued)

OTHER PUBLICATIONS

International Search Report mailed on Nov. 1, 2011 for the corresponding International patent application No. PCT/JP2011/004238.

(Continued)

*Primary Examiner* — Melvin Jones
(74) *Attorney, Agent, or Firm* — Posz Law Group, PLC

(57) ABSTRACT

A humidity control apparatus and an air-conditioning system are capable of controlling the latent heat processing amount and the sensible heat processing amount in accordance with an indoor heat load without decreasing the operation efficiency. Every time an air route is switched to an air route A or an air route B, the route maintenance time for the switched air route is set on the basis of the heat load within a dehumidification target space, and switching of switching devices is controlled such that the set route maintenance time is ensured.

16 Claims, 10 Drawing Sheets

(56) References Cited

U.S. PATENT DOCUMENTS

| | | | | |
|---|---|---|---|---|
| 5,758,508 | A * | 6/1998 | Belding | B01D 53/261 62/271 |
| 7,568,355 | B2 * | 8/2009 | Yabu | F24F 3/1411 62/271 |
| 2005/0150237 | A1 | 7/2005 | Yabu | |

FOREIGN PATENT DOCUMENTS

| JP | 03-039831 A | 2/1991 |
|---|---|---|
| JP | 2001-173992 A | 6/2001 |
| JP | 2002-191971 A | 7/2002 |
| JP | 3540530 | 4/2004 |
| JP | 2005-034838 A | 2/2005 |
| JP | 2005-049059 A | 2/2005 |
| JP | 2005-131544 A | 5/2005 |
| JP | 2005-291587 A | 10/2005 |
| JP | 2010-084970 A | 4/2010 |
| JP | 4513380 B2 | 5/2010 |
| JP | 2010-121912 A | 6/2010 |
| JP | 2010-249485 A | 11/2010 |

OTHER PUBLICATIONS

U.S. Appl. No. 13/882,614, filed Aug. 22, 2013, Ito et al.
Office Action issued Aug. 31, 2015 in the corresponding CN application No. 201180072577.8 (with English translation).
Extended European Search Report issued on Jun. 24, 2015 in the corresponding EP application No. 11870018.6.
Office Action mailed Mar. 3, 2015 issued in corresponding JP patent application No. 2013-525436 (and English translation).

* cited by examiner

F I G. 5
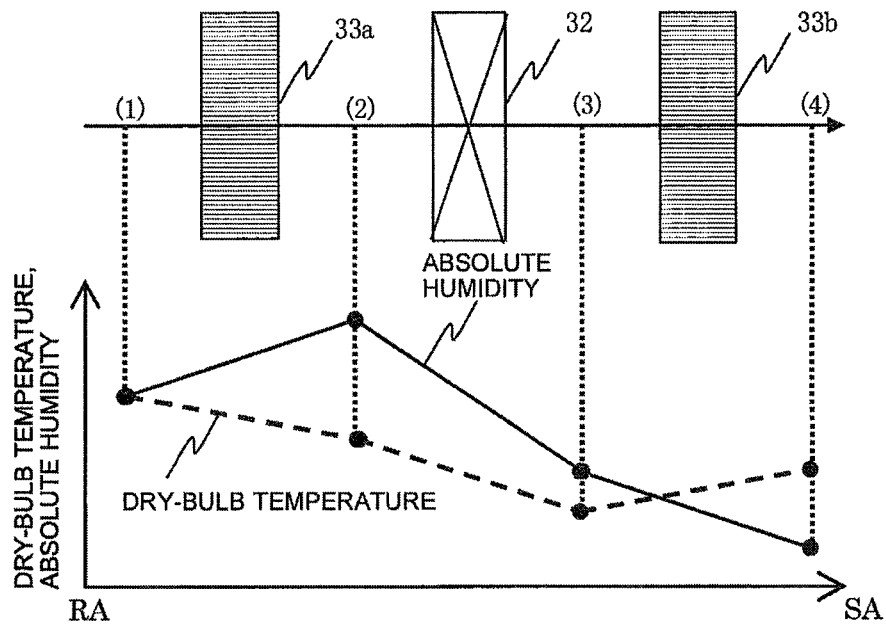
F I G. 6
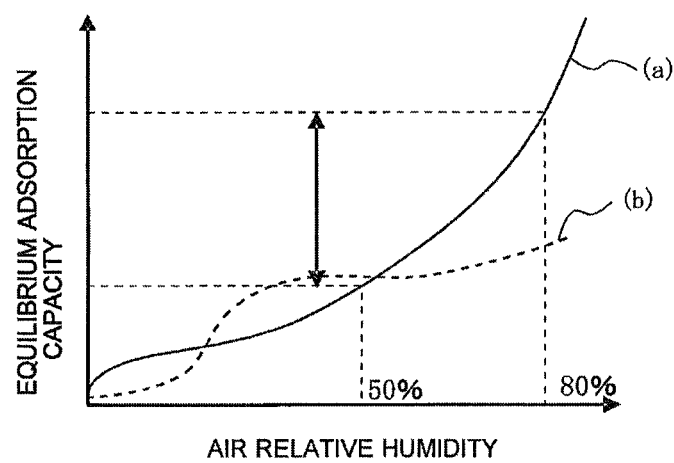

F I G. 7
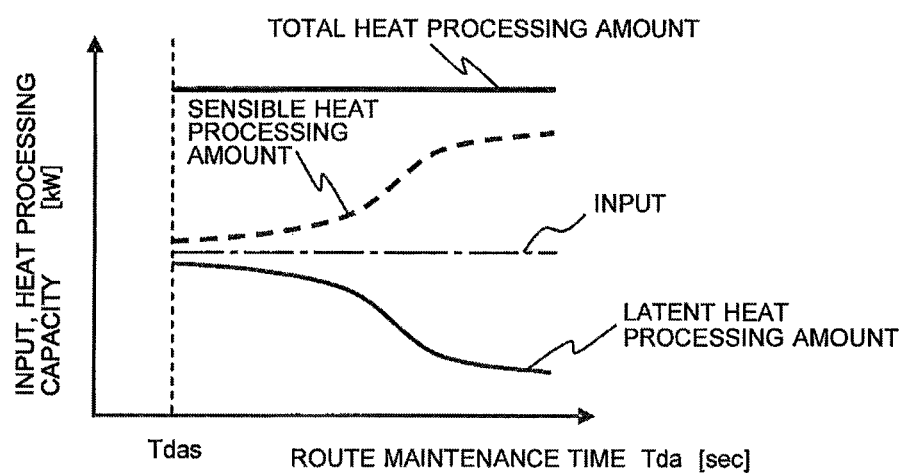

F I G. 1 1
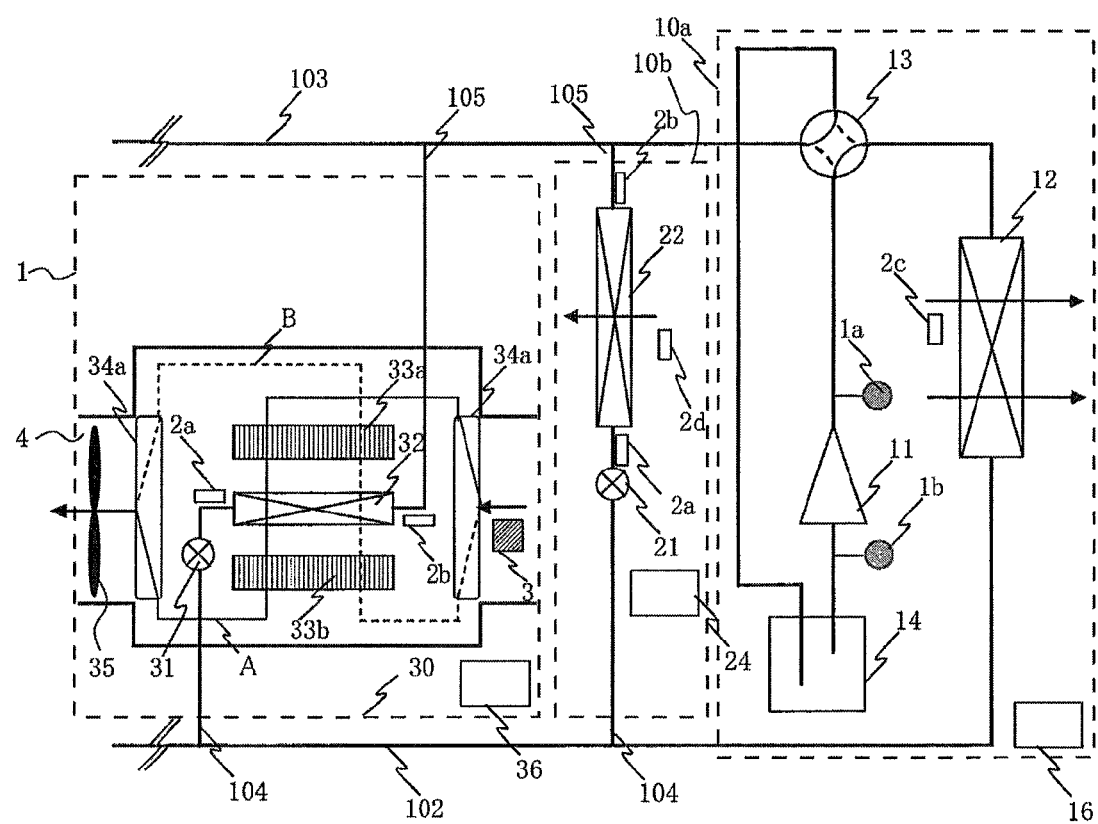

input              output

HUMIDITY CONTROL APPARATUS AND AIR-CONDITIONING SYSTEM

CROSS REFERENCE TO RELATED APPLICATION

This application is a U.S. national stage application of PCT/JP2011/004238 filed on Jul. 27, 2011, the contents of which are incorporated herein by reference.

TECHNICAL FIELD

The present invention relates to a humidity control apparatus that controls indoor humidity and an air-conditioning system that includes the humidity control apparatus.

BACKGROUND ART

As an apparatus that processes an indoor latent heat load by supplying humidity-controlled air into a room, an air-conditioning apparatus that has a dehumidifying function (see, for example, Patent Literature 1) and a humidity control apparatus provided with a heat exchanger, which carries adsorbent that adsorbs moisture, in a refrigerant circuit (see, for example, Patent Literature 2), are hitherto known.

The air-conditioning apparatus of Patent Literature 1 includes a refrigerant circuit including an outdoor heat exchanger on a heat source side and an indoor heat exchanger on a use side, and performs a refrigeration cycle by causing a refrigerant to circulate through the refrigerant circuit. The air-conditioning apparatus dehumidifies the room by setting the refrigerant evaporating temperature of the indoor heat exchanger to be lower than a dew-point temperature of the indoor air and condensing the moisture in the indoor air.

Furthermore, the humidity control apparatus of Patent Literature 2 is provided with two heat exchangers loaded with adsorbent. While one heat exchanger is used as a high-pressure and high-temperature heat exchanger for performing desorption of moisture, the other is used as a low-pressure and low-temperature heat exchanger for performing adsorption of moisture. Adsorption and desorption are repeated by inverting the direction of circulation of a refrigerant to switch between high and low pressures by performing switching of a four-way valve at predetermined time intervals.

PATENT LITERATURE

Patent Literature 1: Japanese Patent No. 3540530 (Page 7, FIG. 1)
Patent Literature 2: Japanese Unexamined Patent Application Publication No. 2010-121912 (Claim 1, FIG. 1)

In the apparatuses of Patent Literature 1 and Patent Literature 2, upon controlling the amount of dehumidification, it is necessary to control a refrigerant circuit, such as by changing the evaporating temperature of a refrigerant or reversing the refrigerant circuit. However, if these controls are to be performed, there is a problem that it takes time for the refrigeration cycle to start in its stable capability, and therefore the operation efficiency decreases.

Furthermore, in indoor air conditioning, in improving the comfort of the indoor environment, processing for a sensible heat load as well as a latent heat load in the room is required.

SUMMARY

The present invention has been made in order to solve the above-mentioned problems, and an object of the present invention is to obtain a humidity control apparatus and an air-conditioning system that are capable of controlling the latent heat processing amount and the sensible heat processing amount, according to the indoor heat load, without decreasing the operation efficiency.

A humidity control apparatus according to the present invention includes a main body including an air inlet into which air from a dehumidification target space is taken and an air outlet through which air is supplied to the dehumidification target space, an air path arranged within the main body and configured to connect the air inlet and the air outlet, a first moisture adsorption/desorption device arranged within the air path and configured to transfer moisture to air having a relatively low humidity and receive moisture from air having a relatively high humidity, a second moisture adsorption/desorption device arranged within the air path so as to be separated from the first moisture adsorption/desorption device and configured to transfer moisture to air having the relatively low humidity and receive moisture from air having the relatively high humidity, a cooling device arranged between the first moisture adsorption/desorption device and the second moisture adsorption/desorption device and configured to cool air that has been humidified by moisture transfer by the first moisture adsorption/desorption device or the second moisture adsorption/desorption device, switching devices arranged within the air path and configured to alternately switch between a first air route and a second air route, the first air route being an air route through which the air taken through the air inlet passes in order of the first moisture adsorption/desorption device, the cooling device, and the second moisture adsorption/desorption device, the second air route being an air route through which the air taken through the air inlet passes in order of the second moisture adsorption/desorption device, the cooling device, and the first moisture adsorption/desorption device in that order, and a controller configured to set, every time the air routes are switched to the first air route or the second air route, a route maintenance time for the switched air route on the basis of a heat load within the dehumidification target space, and control switching of the switching devices such that the set route maintenance time is ensured.

According to the present invention, only by changing the route maintenance time for an air route, the balance between the sensible heat processing capacity and the latent heat processing capacity can be changed, and the sensible heat processing amount and the latent heat processing amount can be controlled.

BRIEF DESCRIPTION OF DRAWINGS

FIG. 5 is a dry-bulb temperature diagram during a period in which indoor air RA passing through each part within the humidity control apparatus becomes humidity-controlled air SA.

FIG. 6 is a diagram illustrating the relationship between the relative humidity and equilibrium adsorption capacity of adsorbent used in a moisture adsorption/desorption device of FIG. 1.

FIG. 7 is a diagram illustrating a change in the input and the heat processing amount in the case where a route maintenance time Tda is extended.

FIG. 11 is a refrigerant circuit diagram of the air-conditioning system according to Embodiment 2 of the present invention.

DETAILED DESCRIPTION

Embodiment 1

Figure 1:
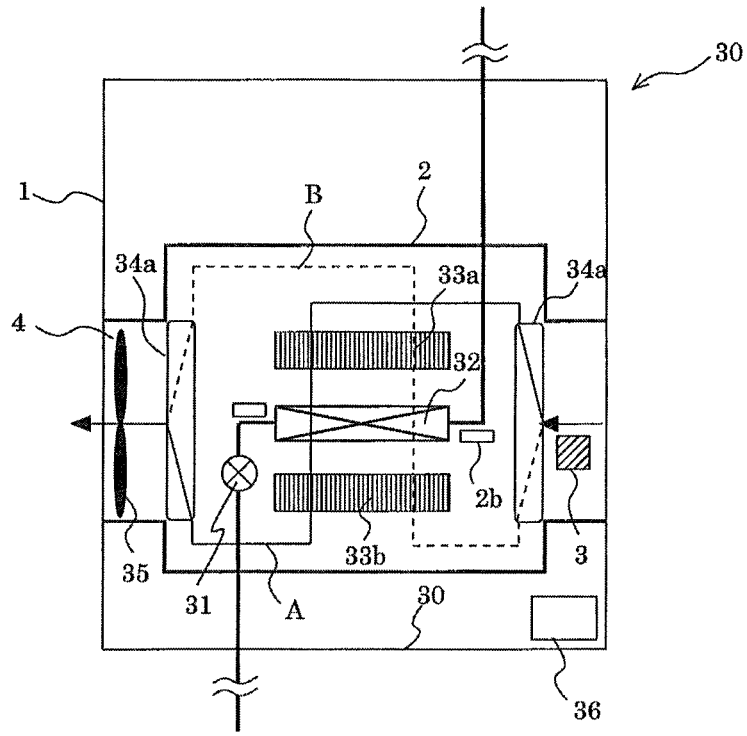
FIG. 1 is a schematic diagram illustrating a configuration of a humidity control apparatus according to Embodiment 1 of the present invention.
Figure 2:
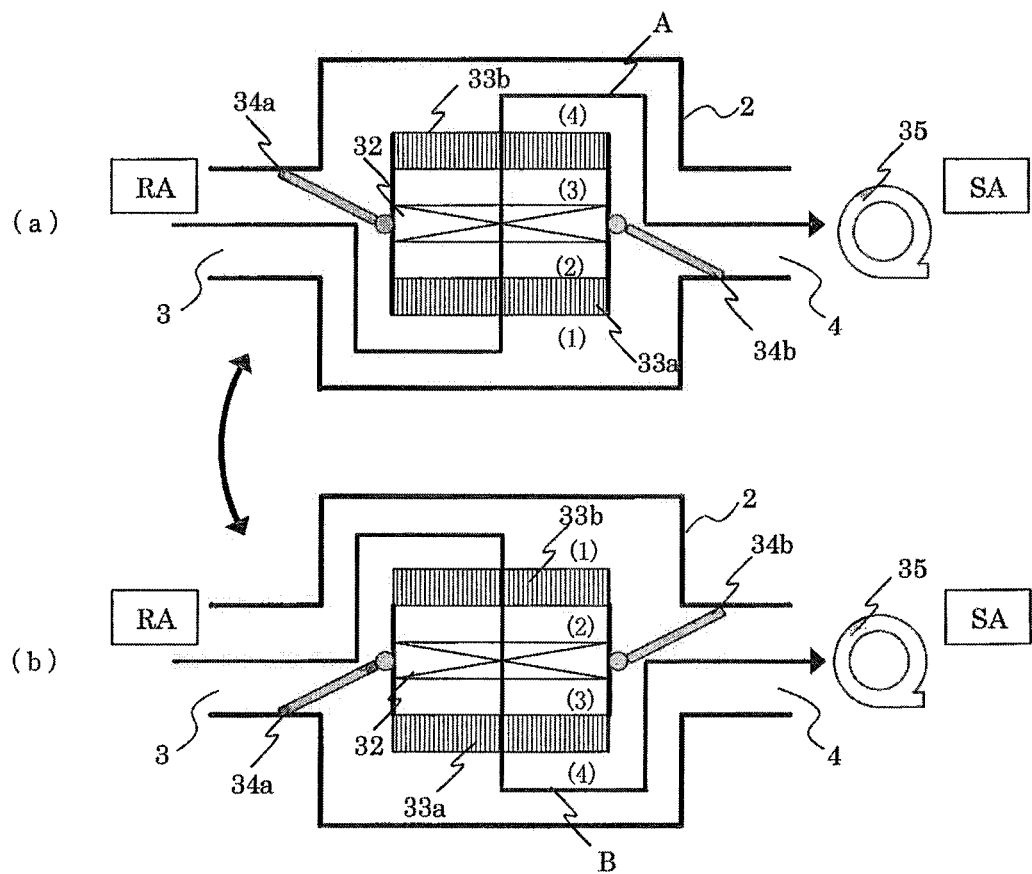
FIG. 2 includes explanatory diagrams of configurations of air paths in the humidity control apparatus of FIG. 1.

FIG. 1 is a schematic diagram illustrating a configuration of a humidity control apparatus according to Embodiment 1 of the present invention. FIG. 2 includes explanatory diagrams for each explaining the flow of air in the humidity control apparatus of FIG. 1. Components that are given the same reference signs in FIG. 1, FIG. 2, and further illustrations described later are equivalent to or corresponding to one another, which is common throughout the description. In addition, forms of the components that appear throughout the specification are merely examples, and are not intended to be limited to this.

Hereinafter, a humidity control apparatus 30 will be described, with reference to FIGS. 1 and 2.

The humidity control apparatus 30 includes a main body 1 including an air inlet 3 into which indoor air RA from a room, which is a dehumidification target space, is taken and an air outlet 4 through which humidity-controlled air SA is supplied into the room. The humidity control apparatus 30 also includes an air path 2 that allows connection between the air inlet 3 and the air outlet 4 and through which air flows. The air path 2 includes therein moisture adsorption/desorption devices 33a and 33b that adsorb moisture contained in air or desorb moisture into air, a cooling device 32 that cools air, an indoor air-sending device 35 (see FIG. 3, described later) that sends air from within the air path 2, and switching devices 34a and 34b that perform switching of the route of air flowing through the air path 2. In addition, the humidity control apparatus 30 also includes a humidity control apparatus control board 36.

FIG. 2(a) illustrates an air route A of FIG. 1, and FIG. 2(b) illustrates an air route B of FIG. 1. The air route A is a route through which indoor air is taken from the air inlet 3, passes through the moisture adsorption/desorption device 33a, the cooling device 32, and the moisture adsorption/desorption device 33b, and is supplied as humidity-controlled air from the air outlet 4 via the indoor air-sending device 35 into the room. The air route B is a route through which indoor air is taken from the air inlet 3, passes through the moisture adsorption/desorption device 33b, the cooling device 32, and the moisture adsorption/desorption device 33a, and is supplied as humidity-controlled air from the air outlet 4 via the indoor air-sending device 35 into the room.

Switching between the air route A and the air route B may be implemented with the switching devices 34a and 34b. Embodiment 1 is characterized in the switching control, which will be described later. Dampers or the like are used as the switching devices 34a and 34b. Although not illustrated, the switching devices 34a and 34b perform switching of an air route by controlling a rotation operation of a motor used in a damper operation.

The air path 2 has a structure in which a pipeline that allows connection between the air inlet 3 and the air outlet 4 branches off into two directions in the middle thereof. The switching device 34a is positioned at a location where the branch begins, and the switching device 34b is positioned at a location where the branch ends. The moisture adsorption/desorption device 33a, the cooling device 32, and the moisture adsorption/desorption device 33b are arranged in positions to be sandwiched between the switching devices 34a and 34b, and are positioned in a direction in which air flows in substantially a right angle direction with respect to the flow direction of the air flowing from the air inlet 3 towards the air outlet 4. With this air path structure, it is possible to configure two air routes in one air path 2 only by the switching operation of the switching devices 34a and 34b, without requiring a complicated pipeline structure.

In order to acquire a large number of ventilation cross-sectional areas, the moisture adsorption/desorption devices 33a and 33b are each made of a porous flat plate or the like having a polygonal section along the cross-section of the pipeline in the air path 2 where the moisture adsorption/desorption devices 33a and 33b are positioned, and are each have pores so that the air can pass through in the thickness direction. Furthermore, within the air path 2, the moisture adsorption/desorption devices 33a and 33b are arranged as described above. Therefore, in order to increase the ventilation cross-sectional area, the interval between the switching devices 34a and 34b (the horizontal direction of FIG. 2) in the air path 2 may be increased so that the cross-sectional area of each of the moisture adsorption/desorption devices 33a and 33b can be increased. Thus, the size increase in the width direction of the main body 1 (the vertical direction of FIG. 2) can be suppressed. Incidentally, the porous flat plate is not limited to a particular shape as long as it is a shape formed along the cross-section of the pipeline and an effect similar to the effect mentioned above can be achieved.

In each case of the air route A and the air route B, the moisture adsorption/desorption devices 33a and 33b and the cooling device 32 are arranged in such a manner that they are substantially in series with one another in the direction of the air flow, and the cooling device 32 is positioned between the moisture adsorption/desorption devices 33a and 33b. By arranging the moisture adsorption/desorption devices 33a and 33b and the cooling device 32 in such a manner that the surfaces of the devices where the air passes face one another, the devices can fit into a small space within the air path 2, and it is possible to miniaturize the humidity control apparatus 30. It should be noted that the angle at which the devices face one another may be a little deviated, and a similar effect may be achieved even in this case.

The surface of the porous flat plate that forms each of the moisture adsorption/desorption devices 33a and 33b is coated, surface treated, or impregnated with adsorbent with properties of absorbing moisture from air having a relatively high humidity (moisture reception) and desorbing moisture into air having a relatively low humidity (moisture transfer). Such adsorbent holds the amount of moisture that can be adsorbed with respect to the relative humidity of the air (equilibrium adsorption capacity). Upon reaching the equilibrium adsorption capacity after the adsorbent keeps adsorbing moisture from the air of a relative humidity, the adsorbent becomes equilibrium and is no longer capable of adsorbing moisture. Therefore, it is necessary to desorb the moisture into the air to make the adsorbent to be in a re-absorbable state, and furthermore, it is necessary to alternately repeat the adsorption operation and the desorption operation.

The cooling device 32 is provided in order to cool the air that has passed through the moisture adsorption/desorption device 33a or 33b to the dew-point temperature or below, while increasing the relative humidity of the air, and to remove the moisture contained in the air as condensed water. Although not illustrated, similar to general humidity control apparatuses, for example, by providing a drainage channel, water condensed by the cooling device 32 is discharged outside the main body 1.

As the cooling device 32, an evaporator, which is a low-temperature-side heat exchanger of a heat pump in the refrigeration cycle, a brine cooler, or the like is used. Although not illustrated, when a brine cooler is used, brine cooled by a brine circuit is caused to pass through a pipe of a fin-tube heat exchanger, and the air is cooled by passing through the heat exchanger. Here, an evaporator is used, and an expansion valve 31 as an expansion device is connected to a pipe connected to the evaporator. Furthermore, temperature sensors 2a and 2b are connected to pipes connected to the evaporator. Based on temperature information measured by the temperature sensors 2a and 2b, the opening degree of the expansion valve 31 is controlled by the humidity control apparatus control board 36 which will be described later, and it is therefore possible to control the evaporating temperature-e of the evaporator.

The indoor air-sending device 35 includes a fan or the like and is capable of setting the air flow rate of the air flowing through the air path 2, according to the conditions of the air. When a DC motor is used as a motor to rotate the fan, the air flow rate may be controlled by controlling the rotation speed by changing the value of current. When an AC motor is used, the air flow rate can be controlled by controlling the rotation speed by changing the power supply frequency through inverter control.

Furthermore, by controlling the air flow rate of the indoor air-sending device 35, the flow velocity of the air passing through the moisture adsorption/desorption devices 33a and 33b also change. The adsorption/desorption rate of adsorbent used in the moisture adsorption/desorption devices 33a and 33b (moisture moving speed between the air and the adsorbent at the time of adsorption/desorption) increases when the flow velocity of the air passing through the adsorbent increases. Therefore, by increasing the air flow rate of the indoor air-sending device 35, the adsorption/desorption capacity of the adsorbent can be increased.

In addition, the indoor air-sending device 35 is arranged at the most downstream position in the air path 2 in Embodiment 1. However, as long as a target air flow rate for the air routes A and B is obtained, the indoor air-sending device 35 may be arranged upstream the position at which the indoor air-sending device 35 is arranged in FIG. 2, for example, the indoor air-sending device 35 may be arranged at the most upstream position in the air path 2. Furthermore, a plurality of indoor air-sending devices 35 may be arranged in different positions, such as in an upstream position and a downstream position. Therefore, the number of the indoor air-sending devices 35 and the arrangement position of the indoor air-sending devices 35 are not limited.

Figure 3:
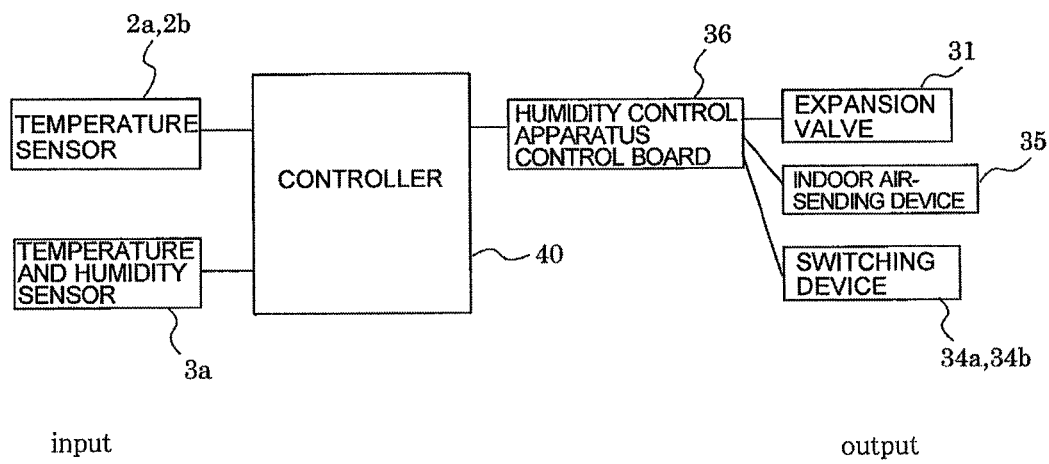
FIG. 3 is a control block diagram of the humidity control apparatus of FIG. 1.

FIG. 3 is a control block diagram of the humidity control apparatus of FIG. 1.

As well as receiving a setting operation on temperature and humidity, the humidity control apparatus 30 includes a controller 40 that performs various types of control. The temperature sensors 2a and 2b and a temperature and humidity sensor 3a are connected to the controller 40. Based on sensor information from these sensors, the controller 40 performs controls including control of the expansion valve 31, control of the air flow rate of the indoor air-sending device 35, and control of the switching of the switching devices 34a and 34b, via the humidity control apparatus control board 36.

Dehumidifying Operation

Next, a dehumidifying operation of the humidity control apparatus 30 will be described.

An operation of the humidity control apparatus according to Embodiment 1 will now be described.

Figure 4:
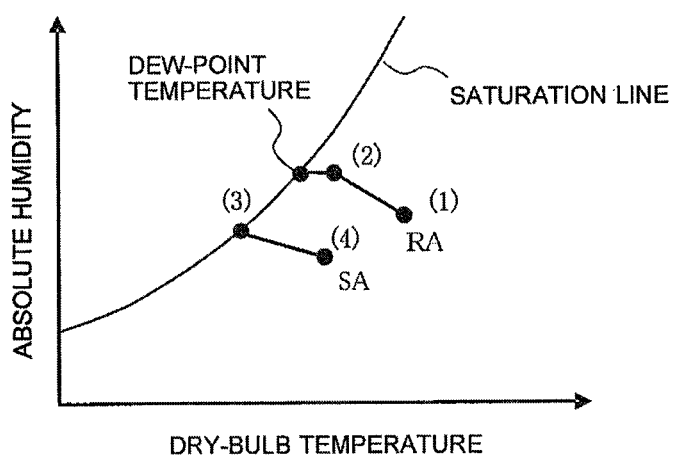
FIG. 4 is a moist air diagram illustrating a state change of air during an operation of the humidity control apparatus of FIG. 2.

FIG. 4 is a moist air diagram illustrating a state change of air during an operation of the humidity control apparatus of FIG. 2. The vertical axis of the moist air diagram of FIG. 4 represents the absolute humidity of the air and the horizontal axis represents the dry-bulb temperature of the air. Furthermore, the curve in FIG. 4 represents a saturation line (relative humidity of 100 percent). In FIG. 4, the air state in the moist air diagram is illustrated in (1) to (4), corresponding to (1) to (4) of FIG. 2(a), and (1) to (4) of FIG. 2(b), respectively. FIG. 5 is a diagram illustrating the state of changes in the dry-bulb temperature (dotted line in FIG. 5) and the absolute humidity (solid line in FIG. 5) during a period in which the indoor air RA passing through various parts within the humidity control apparatus becomes the humidity-controlled air SA. The horizontal axis represents a route and the vertical axis represents the dry-bulb temperature and the absolute humidity.

A state change of the air in the case of the air route A will be described, with reference to FIG. 2(a), FIG. 4, and FIG. 5.

The indoor air RA in the state (1) is introduced into the air inlet 3 of air path 2, and flows into the moisture adsorption/desorption device 33a. In indoor environment, the relative humidity of the introduced air tends to be 40 to 60 percent, and the moisture adsorption/desorption device 33a desorbs moisture in accordance with the moisture content of the moisture adsorption/desorption device 33a at that time, in other words, the moisture adsorption/desorption device 33a releases moisture into the air. Therefore, the air passing through the moisture adsorption/desorption device 33a is humidified, the dry-bulb temperature decreases while the absolute humidity increases, and the state (2) is entered. In addition, due to the increase in the absolute humidity, the dew-point temperature increases. Here, the dry-bulb temperature decreases due to a heat receiving reaction of the moisture adsorption/desorption device 33a during desorption. Accordingly, in the state change from the state (1) to the state (2), due to the desorption reaction of the moisture adsorption/desorption device 33a, the air is humidified and the dew-point temperature is increased, so that the air state is changed into a state in which the moisture is easily condensed by the cooling device 32 through which the air passes next.

The air in the state (2) flows into the cooling device 32. The air that has flowed into the cooling device 32 is cooled to a temperature at or below the dew-point temperature when passing through the cooling device 32 to enter the state (3). By cooling the air to the temperature at or below the dew-point temperature, the amount of moisture corresponding to the difference between the absolute humidity in the state (2) and the absolute humidity in the state (3) is condensed, and the air is dehumidified. Through this cooling process, the air becomes saturated, and the relative humidity of the air increases to approximately 100 percent. Thus, in the state change from the state (2) to the state (3), the air is dehumidified and the relative humidity of the air is increased, so that the air state is changed to a state in which the moisture is easily adsorbed by the moisture adsorption/desorption device 33b through which the air passes next.

The air in the state (3) flows into the moisture adsorption/desorption device 33b. The moisture adsorption/desorption device 33b adsorbs moisture from the air in accordance with the moisture content of the moisture adsorption/desorption device 33b at that time. Therefore the air passing through the moisture adsorption/desorption device 33b is dehumidified, the dry-bulb temperature increases while the absolute humidity decreases, and the state (4) is entered. Here, the dry-bulb temperature increases due to a heat transfer reaction of the moisture adsorption/desorption device 33b during the adsorption. Thus, in the state change from the state (3) to the state (4), by the adsorption reaction of the moisture adsorption/desorption device 33b, the air is dehumidified and turned into humidity-controlled air to be supplied into the room.

The air in the state (4) is supplied into the room as humidity-controlled air through the indoor air-sending device 35, from the air outlet 4 of the air path 2.

A state change of the air in the case of the air route B will now be described, with reference to FIG. 2(b), FIG. 4, and FIG. 5.

The indoor air in the state (1) is introduced into the air inlet 3 of air path 2, and flows into the moisture adsorption/desorption device 33b. Here, in indoor environment, the relative humidity of the introduced air tends to be 40 to 60 percent, and the moisture adsorption/desorption device 33b desorbs moisture in accordance with the moisture content of the moisture adsorption/desorption device 33b at that time, in other words, the moisture adsorption/desorption device 33b releases moisture into the air. Hence, the air passing through the moisture adsorption/desorption device 33b is humidified, the dry-bulb temperature decreases while the absolute humidity increases, and the state (2) is entered. In addition, due to the increase in the absolute humidity, the dew-point temperature increases. Here, the dry-bulb temperature decreases due to a heat receiving reaction of the moisture adsorption/desorption device 33b during desorption. Thus, in the state change from the state (1) to the state (2), due to the desorption reaction of the moisture adsorption/desorption device 33b, the air is humidified and the dew-point temperature is increased, so that the air state is changed into a state in which the moisture is easily condensed by the cooling device 32 through which the air passes next.

The air in the state (2) flows into the cooling device 32. The air that has flowed into the cooling device 32 is cooled to a temperature at or below the dew-point temperature when passing through the cooling device 32 to enter the state (3). By cooling the air to the temperature at or below the dew-point temperature, the amount of moisture corresponding to the difference between the absolute humidity in the state (2) and the absolute humidity in the state (3) is condensed, and the air is dehumidified. Through this cooling process, the air becomes saturated, and the relative humidity of the air increases to approximately 100 percent. Thus, in the state change from the state (2) to the state (3), the air is dehumidified and the relative humidity of the air is increased, so that the air state is changed into a state in which the moisture is easily adsorbed by the moisture adsorption/desorption device 33a through which the air passes next.

The air in the state (3) flows into the moisture adsorption/desorption device 33a. The moisture adsorption/desorption device 33a adsorbs moisture from the air in accordance with the moisture content of the moisture adsorption/desorption device 33a at that time, the air passing through the moisture adsorption/desorption device 33a is dehumidified, the dry-bulb temperature increases while the absolute humidity decreases, and the state (4) is entered. Here, the dry-bulb temperature increases due to a heat transfer reaction of the moisture adsorption/desorption device 33a during the adsorption. Thus, in the state change from the state (3) to the state (4), by the adsorption reaction of the moisture adsorption/desorption device 33a, the air is dehumidified and turned into humidity-controlled air to be supplied into the room.

The air in the state (4) is supplied into the room as humidity-controlled air through the indoor air-sending device 35, from the air outlet 4 of the air path 2.

The switching between the air route A and the air route B is performed by operating the switching devices 34a and 34b. By switching between the air route A and the air route B, the moisture adsorption/desorption device 33a which had a desorption reaction in the air route A changes into having an adsorption reaction in the air route B, meanwhile the moisture adsorption/desorption device 33b which had an adsorption reaction in the air route A changes into having a desorption reaction in the air route B. Thus, by the switching operations of the switching devices 34a and 34b, adsorption and desorption are alternately performed. Therefore, the dehumidifying operation can be continuously performed.

Here, as the adsorbent used in the moisture adsorption/desorption devices 33a and 33b, in Embodiment 1, adsorbent which has properties of having a large equilibrium adsorption capacity (the amount of water that can be adsorbed with respect to the relative humidity of the air) when the relative humidity is 80 to 100 percent and having a large difference from the equilibrium adsorption capacity when the relative humidity is 40 to 60 percent, is used.

FIG. 6 is a diagram illustrating the relationship between the relative humidity and the equilibrium adsorption capacity of adsorbent used on the moisture adsorption/desorption device of FIG. 1. The vertical axis represents the equilibrium adsorption capacity, and the horizontal axis represents the relative humidity. The solid curve (a) represents the properties of the adsorbent used in the moisture adsorption/desorption device 33a and 33b, and the dotted curve (b) represents the properties of another adsorbent, for the purpose of comparison.

As illustrated in FIG. 6, the adsorbent used in the moisture adsorption/desorption devices 33a and 33b has properties that the equilibrium adsorption capacity increases in substantially a straight line when the relative humidity of the air is 40 to 100 percent and the equilibrium adsorption capacity is particularly large in a high humidity range (relative humidity of 80 to 100 percent). That is, by increasing the relative humidity difference in the air passing through the moisture adsorption/desorption devices 33a and 33b between during adsorption and during desorption, the difference in the equilibrium adsorption capacity increases. Therefore, the adsorption/desorption capacity can be increased.

In the case of adsorbent illustrated as a comparative example, an increase in the equilibrium adsorption capacity relative to an increase in the relative humidity is small. Thus, for dehumidification of the air in a general indoor space (relative humidity of approximately 40 to 60 percent) using the adsorbent in the comparative example, in order to differentiate the equilibrium adsorption capacity of passing air during adsorption from that of during desorption, reducing the relative humidity of the air to approximately 20 percent by providing a desorption heat source, such as a heating device, and heating the air before desorption is required.

However, since adsorbent that has a large equilibrium adsorption capacity in particular in a high humidity range (relative humidity of 80 to 100 percent) is used in the moisture adsorption/desorption devices 33a and 33b here, a sufficient difference of the equilibrium adsorption capacity of the air from that of in a general indoor space (relative humidity of approximately 40 to 60 percent) can be produced. Therefore, with the use of adsorbent having such properties, a dehumidifying operation can be performed without providing a desorption heat source in the air path 2.

Adsorbents having the above-mentioned properties include, for example, sodium polyacrylate cross-linked product as an organic adsorbent, and nanotube silicate (imogolite) or aluminum silicate (HASclay) as an inorganic adsorbent.

Embodiment 1 is characterized in the switching control of the air routes A and B by the switching devices 34a and 34b, as described above. Hereinafter, prior to the description for the switching control, the heat processing capacity in the humidity control apparatus 30 will be described. Hereinafter, description will be made on the assumption that a room is cooled by an air-conditioning apparatus that is different from the humidity control apparatus 30 and the same space is dehumidified by the humidity control apparatus 30.

Heat Load Processing Amount in Humidity Control Apparatus

FIG. 7 is a diagram illustrating a change in input and heat processing amount when a route maintenance time Tda is extended. The horizontal axis represents the route maintenance time Tda, and the vertical axis represents input and heat processing capacity. Input represents input power to a refrigeration cycle including an evaporator forming the cooling device 32. The heat processing amount includes the latent heat processing amount, the sensible heat processing amount, and the total heat processing amount. The latent heat processing amount represents the capacity that can change the humidity of air to be processed, the sensible heat processing amount represents the capacity that can change the temperature of air to be processed, and the total heat processing amount represents the sum of the latent heat processing amount and the sensible heat processing amount.

As illustrated in FIG. 7, the humidity control apparatus 30 has a property that the sensible heat processing amount increases as the route maintenance time Tda increases and, in contrast, the latent heat processing amount reduces. That is, for example, comparing the case where the air route A is continuously used during an default time Tdas with the case where the air route A is used during a time longer than the default time Tdas, a larger sensible heat processing amount and a smaller latent heat processing amount are obtained in the case where the air route A is used during the time longer than the default time Tdas. Furthermore, as is clear from FIG. 7, the balance between the sensible heat processing amount and the latent heat processing amount changes according to the route maintenance time Tda even if the input is constant.

Hereinafter, a reason why the latent heat processing amount and the sensible heat processing amount change according to the route maintenance time Tda as described above will be described in detail.

When the route maintenance time Tda extends, adsorbent becomes saturated and adsorption reaction does not occur. Furthermore, no desorption reaction occurs on the desorption side, and a time during which only the cooling device 32 performs heat processing occurs. More specifically, for example, the case of the air route A will be described. A time during which no desorption reaction occurs in the moisture adsorption/desorption device 33a and no adsorption reaction occurs in the moisture adsorption/desorption device 33b, occurs. When no desorption reaction occurs in the moisture adsorption/desorption device 33a, since the dew-point temperature of the air that has passed through the moisture adsorption/desorption device 33a does not increase, a state in which moisture is easily condensed by the cooling device 32 through which the air passes next cannot be generated. Therefore, the amount of dehumidification decreases. From the above description, comparing the state immediately after switching between routes is performed with an almost saturated state, a smaller latent heat processing amount is obtained in the almost saturated state.

In contrast, when the route maintenance time Tda is extended, the sensible heat processing capacity increases for the reasons described below. Here again, the case of the air route A will be described. The moisture adsorption/desorption device 33a has a heat transfer reaction at the time of adsorption as described above, and the heat transfer reaction is weakened as the saturated state is approached. Therefore, comparing the state immediately after switching between routes is performed with an almost saturated state, a larger sensible heat processing amount is obtained in the almost saturated state.

Although there is a difference in the temperature and humidity between the air passing through the cooling device 32 in the initial state of switching between air routes and the air passing through the cooling device 32 after adsorbent is saturated, the enthalpies of the airstreams are substantially the same. This is because the temperature and the humidity of air change along with substantially an isenthalpic line when the adsorption/desorption reaction between air and adsorbent occurs. Thus, each of the latent heat processing amount and the sensible heat processing amount changes according to the route maintenance time; whereas, the total heat processing amount does not change. This point will be described below with reference to FIG. 4.

The humidity-controlled air SA is in the state (4) immediately after switching between routes is performed. As the moisture adsorption/desorption devices 33a and 33b saturate, the humidity-controlled air SA approaches the state (3). When finally reaching the saturated state, the humidity-controlled air SA enters the state (3). Here, as is clear from FIG. 4, in the state (3), the dry-bulb temperature lower and the absolute humidity is higher than those of the humidity-controlled air SA in the state (4) immediately after switching between routes is performed. Therefore, as the route maintenance time Tda increases, humidity-controlled air that is more humid and cooler than that immediately after switching between routes is performed is supplied into the room. Therefore, by increasing the route maintenance time Tda, the room is cooled more quickly and the humidity is reduced more slowly than the case where switching between air routes is performed quickly. From the above description, in achieving a comfortable indoor environment, in the case where priority is given to quick reduction in the indoor humidity the route maintenance time Tda can be shortened and switching between air routes is quickly performed. In the case where priority is given to quick reduction in an indoor temperature Tra, after an operation in the state in which the sensible heat processing capacity is large is performed for a long time by extending the route maintenance time Tda, switching between air routes can be performed.

In Embodiment 1, the humidity control apparatus 30 performs the control described below, in view of the properties described above.

Control of Humidity Control Apparatus

Figure 8:
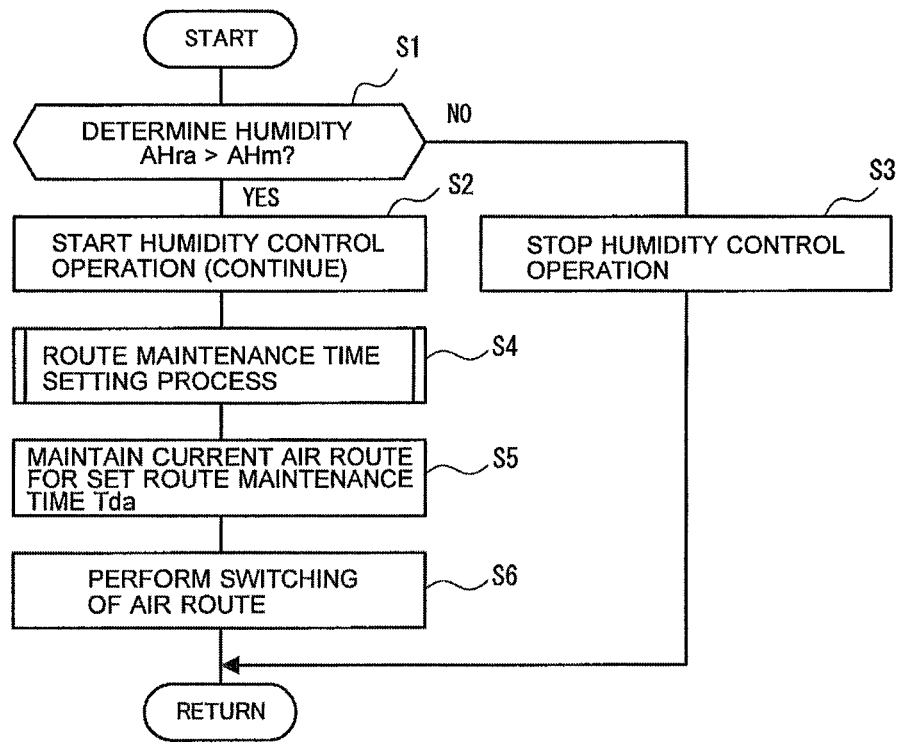
FIG. 8 is a control flowchart in the humidity control apparatus according to Embodiment 1 of the present invention.
Figure 8A:
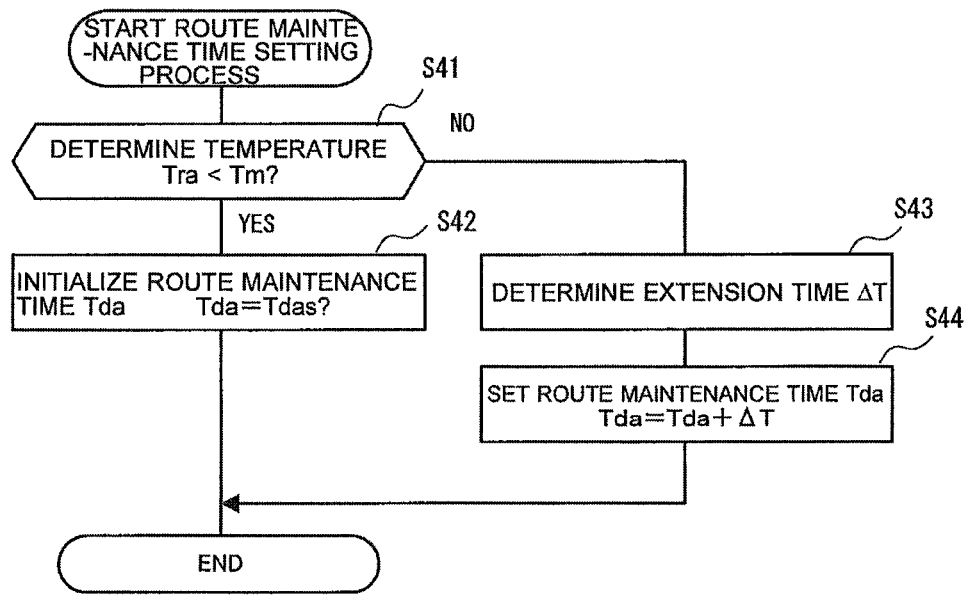
FIG. 8A is a flowchart of a route maintenance time setting process of FIG. 8.

FIG. 8 is a control flowchart in the humidity control apparatus according to Embodiment 1 of the present invention. FIG. 8A is a flowchart of a route maintenance time setting process of FIG. 8. Here, the case where a room is cooled by an indoor unit of an air-conditioning apparatus provided separately from the humidity control apparatus 30 and the humidity control apparatus 30 is operated in order to control the humidity inside the room will be described by way of example. The control flowchart of FIG. 8 illustrates the flow of a process which starts immediately after switching between air routes is performed. Here, description will be made on the assumption that switching into the state of the air route A has been performed. In addition, it is assumed that the cooling capacity of the cooling device 32 is constant.

Here, the outline of control of the humidity control apparatus 30 will be described. The humidity control apparatus 30 starts an operation in the case where the humidity is higher than a set humidity. In the case where the indoor temperature Tra is equal to or higher than a set temperature Tm at the time when the operation starts, an operation which gives priority to reducing the indoor temperature Tra to the set temperature Tm rather than reducing the humidity to the set humidity is performed. This is because human beings have the nature of feeling comfortable when the indoor temperature is proper even if the humidity is high. Therefore, by giving priority to the processing for sensible heat load when the indoor temperature is high, a comfortable indoor environment can be achieved quickly.

From the above-mentioned point of view, after starting an operation, if the indoor temperature Tra is equal to or higher than the set temperature Tm, the humidity control apparatus 30 performs an operation which gives priority to processing for sensible heat load rather than latent heat load. In contrast, in the case where the indoor temperature Tra is lower than the set temperature Tm, the humidity control apparatus 30 performs an operation which gives priority to processing for latent heat load. In the case where priority is given to the processing for sensible heat load, it does not mean that the processing for indoor latent heat load is not performed; it is obvious that the processing for latent heat load and the processing for sensible heat load are performed simultaneously.

Then, when an indoor absolute humidity AHra reaches a set absolute humidity AHm or lower by the above-mentioned operation, the humidity control apparatus 30 stops the operation. Although the state in which the indoor temperature Tra is equal to or higher than the set temperature Tm is used herein as criteria to determine that the processing for latent heat load should be preferentially performed, the criteria is not limited to this. For example, the state in which the indoor temperature Tra is higher than the set temperature Tm by a specific degree or more may be used as the criteria.

Hereinafter, an operation of a humidity control apparatus will be described with reference to the flowcharts of FIGS. 8 and 8A.

First, it is determined whether an operation of the humidity control apparatus 30 is to be started or stopped, on the basis of the indoor absolute humidity AHra and the set absolute humidity AHm (S1). It is to be noted that the indoor absolute humidity AHra can be calculated on the basis of a measurement result of the temperature and humidity sensor 3a, and the set absolute humidity AHm can be calculated on the basis of indoor set temperature Tm and set relative humidity set by a controller (not illustrated).

In the case where the indoor absolute humidity AHra is higher than the set absolute humidity AHm, a humidity control operation starts (S2). That is, the cooling device 32 as well as the indoor air-sending device 35 arranged within the humidity control apparatus 30 are operated. The operation of the cooling device 32 corresponds to controlling the opening degree of the expansion valve 31 to cause a refrigerant having a set evaporating temperature to flow into the cooling device 32. Accordingly, the air passing through the cooling device 32 can be cooled. In the case where the indoor absolute humidity AHra is lower than or equal to the set absolute humidity AHm, the humidity control operation is stopped, that is, the operation of the indoor air-sending device 35 and the cooling device 32 is stopped (S3).

Then, the humidity control apparatus 30 performs processing for setting the route maintenance time Tda for the air route A (S4).

Next, a process for setting the route maintenance time Tda will be described with reference to FIG. 8A.

First, the indoor set temperature Tm set from outside by the controller 40 is compared with the indoor temperature Tra obtained from a measurement result of the temperature and humidity sensor 3a (S41). In the case where the indoor temperature Tra is lower than the set temperature Tm, it is determined that processing for the indoor latent heat load should be preferentially performed, and the route maintenance time Tda is set as the default time Tdas (S42).

In contrast, in the case where the indoor temperature Tra is equal to or higher than the set temperature Tm, in order to cause the indoor temperature Tra to be closer to the set temperature Tm quickly, an extension time $\Delta T$ is determined for the purpose of increasing the route maintenance time Tda to be longer than the default time Tdas (S43). The extension time $\Delta T$ is determined on the basis of the time from the current time to saturation of adsorbent (hereinafter, referred to as a saturation remaining time). Here, for example, one-third of the saturation remaining time is determined as the extension time $\Delta T$.

The saturation remaining time varies according to the current humidity of indoor air and the cooling capacity of the cooling device 32, and can be calculated on the basis of the evaporating temperature of a refrigerant flowing through the cooling device (here, an evaporator) 32 and the temperature and the humidity of air, which are measurement results of the temperature and humidity sensor 3a. Then, a time Tdas+$\Delta T$, which is obtained by adding the extension time $\Delta T$ to Tda (at first, the default time Tdas), is set as the route maintenance time Tda (S44).

Then, the humidity control apparatus 30 maintains the air route A for the route maintenance time Tda set as described above (S5). Then, the air route is switched to the air route B.

Accordingly, processing for one cycle for the air route A is terminated. Then, the process returns to step S1 to perform similar processing for the air route B.

Hereinafter, a specific example will be described. Here, description will be made on the assumption that the indoor absolute humidity AHra is higher than the set absolute humidity AHm. Hereinafter, the flow of an operation of the humidity control apparatus 30 immediately after switching to the air route A is performed, will be described. In addition, here, the default time Tdas is set to 10 minutes.

After switching to the air route A is performed, the indoor absolute humidity AHra is compared with the set absolute humidity AHm (S1). Here, since the indoor absolute humidity AHra is higher than the set absolute humidity AHm, the indoor air-sending device 35 and the cooling device 32 start operation (S2). Accordingly, the indoor temperature control and humidity control start.

Assuming that the indoor temperature Tra is equal to or higher than the set temperature Tm (S41), the extension time ΔT is then determined (S43). Here, assuming that the saturation remaining time is calculated as, for example, 21 minutes, one-third of 21 minutes, that is, 7 minutes, is set as the extension time ΔT. The extension time, 7 minutes, is added to the default time Tdas, and the route maintenance time Tda is set to 17 minutes (S44). The air route A is maintained for 17 minutes (S5). As described above, in the case where the indoor temperature Tra is equal to or higher than the set temperature Tm, by making the route maintenance time Tda to be longer than the default time Tdas, which is 10 minutes, the indoor sensible heat load can be actively processed, compared to the case where the default time Tdas, 10 minutes, is set. Therefore, the indoor temperature Tra can be reduced quickly.

According to the control illustrated in FIG. 8A, the extension time ΔT, which is determined on the basis of the saturation remaining time calculated according to the current indoor environment or the like, is added to the route maintenance time Tda calculated last time. Therefore, the route maintenance time Tda obtained by adding ΔT thereto may exceed the saturation remaining time. Exceeding the saturation remaining time means that operation continues in the state in which the moisture adsorption/desorption devices 33a and 33b are saturated, however, there is no problem if the saturation remaining time is exceeded. Continuing the operation in the state in which the moisture adsorption/desorption devices 33a and 33b are saturated corresponds to that a state in which the sensible heat processing capacity is large lasts for a long time, in other words. Therefore, the sensible heat load can be processed quickly. Thus, in the case where the indoor temperature Tra is equal to or higher than the set temperature Tm, in order to actively process the sensible heat load, the operation may continue in the state in which the moisture adsorption/desorption devices 33a and 33b are saturated. Here, in the case where the route maintenance time Tda obtained by adding ΔT thereto exceeds the saturation remaining time, the route maintenance time Tda may be limited to the saturation remaining time in order to avoid continuing operation in the saturated state. Either control may be performed in a desired manner.

Then, after the route maintenance time Tda, 17 minutes, has passed, the humidity control apparatus 30 switches the air route to the air route B (S6), and the process returns to step S1. Then, processing for one cycle for the air route B starts. First, the determination in step S1 is performed. Here, it is determined to be YES, and the indoor air-sending device 35 and the cooling device 32 continue operation (S2). Then, a process for setting the route maintenance time Tda for the air route B is entered (S4). Here, it is assumed that the indoor temperature Tra is still equal to or higher than the set temperature Tm (S41). In order to determine the extension time ΔT for the air route B, the saturation remaining time is first calculated.

At this point in time, due to the influence of changes in the indoor temperature Tra and the absolute humidity AHra by the humidity control operation in the air route A that has been performed to the present time, a saturation remaining time different from the last time is calculated. Here, for example, the saturated remaining time is calculated as 30 minutes. In this case, the humidity control apparatus 30 determines ΔT to be 10 minutes (S43). Then, 27 minutes, which is obtained by adding 10 minutes, which is ΔT, to 17 minutes, which is the last route maintenance time Tda for the air route A, is set as the route maintenance time Tda for the air route B (S44). Then, the operation for the air route B is maintained for 27 minutes (S5). Accordingly, by causing the route maintenance time Tda for the air route B to be much longer than the last route maintenance time Tda for the air route A, the indoor temperature Tra can be reduced more quickly.

Then, after the operation for the air route B continues for 27 minutes, switching to the air route A is performed again (S6). Then, the process returns to step S1. Then, processing for one cycle for the air route A starts. First, the determination in step S1 is performed. Here, it is determined to be YES, and the indoor air-sending device 35 and the cooling device 32 continue their operations (S2). Then, a process for setting the route maintenance time Tda for the air route A is entered (S4). Here, it is assumed that the indoor temperature Tra becomes lower than the set temperature Tm, as a result of the operation in the air path A for 17 minutes up to the present time and the subsequent operation in the air route B for 27 minutes. The route maintenance time Tda is set again to 10 minutes, which is the default time Tdas, and the operation for the air route A is performed for 10 minutes.

The above-described processing of steps S2 to S6 is repeatedly performed during the period in which the indoor absolute humidity AHra is higher than the set absolute humidity AHm. When the indoor absolute humidity AHra reaches the set absolute humidity AHm or lower, the operation of the humidity control apparatus 30 itself is stopped, that is, the operation of the indoor air-sending device 35 and the cooling device 32 is stopped (S3).

As described above, in Embodiment 1, only by changing the route maintenance time Tda for an air route, the balance between the sensible heat processing capacity and the latent heat processing capacity can be changed, and the sensible heat processing amount and the latent heat processing amount can be controlled. Therefore, in the case where increasing the latent heat processing capacity is required in order to increase the amount of dehumidification, unlike related arts, operations such as increasing the operation frequency of a compressor of a refrigeration cycle, reducing the evaporating temperature, and reversing the flow of a refrigerant in a refrigerant circuit, are eliminated. Thus, the air-conditioning capacity corresponding to the set temperature and humidity can be controlled without impairing the stability of the refrigeration cycle. Consequently, an inconvenience in that the capability cannot be achieved and an uncomfortable state lasts for a long time until the refrigeration cycle is stabilized, can be suppressed, and a target indoor environment can be attained quickly.

As a specific method for setting the route maintenance time Tda, a preset default time Tdas may be set as the route maintenance time Tda in the case where the indoor latent heat load is preferentially processed, and a time that is longer than the default time Tdas may be set as the route maintenance time Tda in the case where the sensible heat load is preferentially processed.

Furthermore, since the extension time ΔT is determined on the basis of the saturation remaining time, a time to reach a desired temperature and humidity can be shortened.

Furthermore, when the operation of the humidity control apparatus 30 starts, during a period in which the indoor temperature Tra is equal to or higher than the set temperature Tm, in order to actively process the sensible heat load, an operation is performed in such a manner that the route maintenance time Tda for a corresponding air route is sequentially extended every time switching between air routes is performed. Therefore, for example, in the case where the default time Tdas is 10 minutes, a time to reach a desired temperature and humidity can be shortened compared to the case where the air route A is maintained for 20 minutes and then the air route B is maintained for another 20 minutes.

Furthermore, in Embodiment 1, in the case where the indoor temperature Tra is lower than the set temperature Tm, the route maintenance time Tda is initialized to the default time Tdas. Therefore, the sensible heat processing capacity can be immediately increased, and a time to reach a desired humidity can be shortened. That is, for example, in the case where the period during which the indoor temperature Tra is equal to or higher than the set temperature Tm continues, the route maintenance time Tda continues to be sequentially extended, and the indoor temperature Tra then becomes lower than the set temperature Tm, the sensible heat processing capacity can be immediately increased by initializing the route maintenance time Tda to the default time Tdas, compared to the case where, for example, the route maintenance time Tda is shortened in a stepwise manner. Therefore, the time to reach the desired humidity can be shortened. In view of the above-described points, initialization to the default time Tdas in the case where the indoor temperature Tra is lower than the set temperature Tm is efficient. However, the present invention is not necessarily limited to this method. The present invention also includes the case where the route maintenance time Tda is shortened in a stepwise manner.

Furthermore, even after an operation starts when the indoor absolute humidity AHra is higher than the set absolute humidity AHm, in the case where the indoor temperature Tra is equal to or higher than the set temperature Tm, the humidity control apparatus 30 performs control by giving priority to reducing the indoor temperature Tra to the set temperature Tm rather than reducing the indoor absolute humidity AHra to the set absolute humidity AHm. Therefore, compared to the case where reducing the humidity is preferentially controlled, after a humidity control operation starts, a comfortable indoor environment can be achieved quickly.

Furthermore, with the use of a moisture adsorption/desorption device using adsorbent having a large equilibrium adsorption capacity in a high humidity range as illustrated in FIG. 6(a), the humidity control apparatus 30 according to Embodiment 1 is capable of desorbing only based on a difference between the moisture content of the moisture adsorption/desorption device 33a or 33b and the equilibrium adsorption capacity determined on the basis of the air relative humidity. That is, desorption can be performed without a desorption heat source, such as a heating device, and a miniaturization of the apparatus can be achieved by omitting a desorption heat source.

Furthermore, since desorption is performed without a desorption heat source, such as a heating device, the cooling device 32 does not need to process the heat quantity acquired by passing air from the desorption heat source. Therefore, only heat processing for return air RA is performed, thus energy saving being achieved.

Furthermore, since no desorption heat source is provided, a temperature difference between the moisture adsorption/desorption device 33a and the moisture adsorption/desorption device 33b when switching of an air route is performed is reduced, and a temperature difference between the temperature of the moisture adsorption/desorption devices 33a and 33b and the temperature of the air passing through the moisture adsorption/desorption devices 33a and 33b is reduced. Therefore, the heat resistance of adsorbent generated by the temperature difference from the air passing through the moisture adsorption/desorption devices 33a and 33b is reduced, and a dehumidifying operation can be performed with high efficiency.

Furthermore, the moisture adsorption/desorption devices 33a and 33b and the cooling device 32 are arranged so as to be substantially in series with one another in the direction of the air flow either in the air route A or the air route B, and the cooling device 32 is arranged between the moisture adsorption/desorption device 33a and the moisture adsorption/desorption device 33b. By arranging the moisture adsorption/desorption devices 33a and 33b and the cooling device 32 in such a manner that the surfaces of the devices where the air passes face one another, the devices can fit into a small space within the air path 2, and it is possible to miniaturize the humidity control apparatus 30. It should be noted that the angle at which the devices face one another may be a little deviated, and a similar effect may be achieved even in this case.

Furthermore, the adsorption/desorption rate of adsorbent used in the moisture adsorption/desorption devices 33a and 33b (moisture moving speed between the air and the adsorbent at the time of adsorption/desorption) depends on temperature as well as air velocity. The adsorption/desorption rate increases as the temperature increases.

Figure 9:
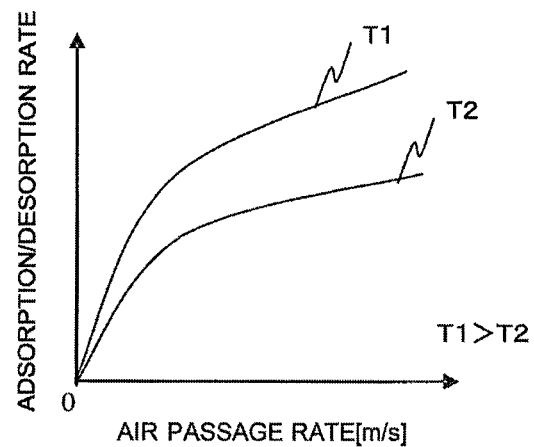
FIG. 9 is a diagram illustrating the relationship between the air passage rate and the adsorption/desorption rate of adsorbent used in the moisture adsorption/desorption device of FIG. 1.

FIG. 9 illustrates the relationship between the air passage rate and the adsorption/desorption rate of adsorbent used in a moisture adsorption/desorption device. In FIG. 9, the vertical axis represents the adsorption/desorption rate of adsorbent, and the horizontal axis represents the passage velocity of air passing through the adsorbent. T1 and T2 in FIG. 9 represent temperatures of the air passing through the adsorbent during adsorption or desorption. T1 is higher than T2, and T1, which has a higher temperature, has a higher adsorption/desorption rate.

Here, assuming that T1 represents the air temperature during desorption and T2 represents the air temperature during adsorption, when a dehumidifying operation is performed at a constant air velocity, there will be a difference in the adsorption and desorption rate between during adsorption and during desorption since there is a difference in the temperature between T1 and T2. At this time, the total amount of moisture travelling between the adsorbent and the air during adsorption and the total amount of moisture travelling between the adsorbent and the air during desorption are in equilibrium with the total amount having a slower adsorption/desorption rate. Since the humidity control apparatus according to Embodiment 1 does not perform heating during desorption, the difference in the air temperature between during adsorption and during desorption is smaller than that in the case where a heating device is provided. Therefore, the difference between the adsorption rate and the desorption rate is smaller. Accordingly, the adsorption rate and the desorption rate uniformly become close to each other, and the potential of the adsorbent can thus be used efficiently.

Furthermore, the moisture adsorption/desorption devices 33a and 33b are fixed within the air path 2 and maintains stationary. Therefore, unlike a desiccant rotor, there is no limitation in the shape occurring due to an operation such as rotation, and the air passage areas of the moisture adsorption/desorption devices 33a and 33b can be arranged to match the shape of the air path 2. Furthermore, ensuring a large air passage area to reduce the air velocity so that the pressure loss can be reduced and increasing the contact area between the adsorbent of the moisture adsorption/desorption devices 33a and 33b and air to increase the adsorption/desorption amount can be achieved.

Furthermore, the air flowing-in direction of the moisture adsorption/desorption devices 33a and 33b is opposite between adsorption and desorption, and the air passage direction is inverted between adsorption and desorption. Therefore, the humidifying/dehumidifying efficiency can be increased.

The air flow at the time of passing through the humidity control apparatus 30 temporarily changes when an operation for switching between the air routes A and B is performed. However, an operation time of the switching devices 34a and 34b can be sufficiently reduced with respect to the cycle of switching between air routes by increasing the rotation speed of motors used for the switching devices 34a and 34b or the like. Therefore, switching between the air routes A and B can be performed without affecting the refrigeration cycle.

Although the configuration not including a desorption heat source is applied in Embodiment 1, a configuration including a desorption heat source may be applied, as well. However, a configuration not including a desorption heat source is more desirable since the various effects described above can be achieved.

Embodiment 2

In Embodiment 2 and later embodiments, the description is made for an air-conditioning system using the humidity control apparatus 30 according to Embodiment 1 and an indoor unit that performs temperature control for performing air conditioning for the same space. In Embodiment 2, in particular, an example of a configuration in which the humidity control apparatus 30 and an indoor unit are connected by a refrigerant circuit to form an air-conditioning system and the cooling device 32 of the humidity control apparatus 30 is configured by an evaporator, which is a low-temperature-side heat exchanger of the refrigerant circuit, will be described. Hereinafter, parts of Embodiment 2 that are different from Embodiment 1 will be mainly described. Modifications applied to components of Embodiment 2 similar to those in Embodiment 1 are also applied to Embodiment 2 in a similar manner. Regarding this point, the same applies to the embodiments described later.

System Configuration

Figure 10:
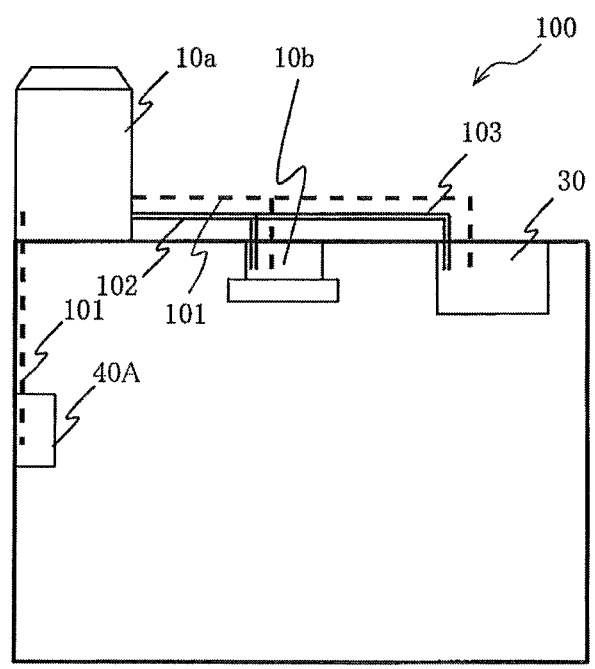
FIG. 10 is a diagram illustrating a configuration of an air-conditioning system according to Embodiment 2 of the present invention.

FIG. 10 is a diagram illustrating a configuration of an air-conditioning system according to Embodiment 2 of the present invention.

An air-conditioning system 100 includes an outdoor unit 10a, an indoor unit 10b, the humidity control apparatus 30, and a controller 40A. The indoor unit 10b and the humidity control apparatus 30 are each connected via branch pipes to a liquid-side main pipe 102 and a gas-side main pipe 103, respectively, that extend from the outdoor unit 10a. The indoor unit 10b and the humidity control apparatus 30 are each connected in parallel to the outdoor unit 10a. The outdoor unit 10a is also connected via a transmission line 101 to each of the indoor unit 10b and the humidity control apparatus 30. The outdoor unit 10a and the controller 40A are also connected via the transmission line 101.

In FIG. 10, although, each of the numbers of the connected indoor unit 10b and the connected humidity control apparatuses 30 is one. However, the numbers of connected units may be individually changed according to the outdoor unit capacity and the required amount of dehumidification, and the number of connected units is not limited thereto. Regarding this point, the same applies to the embodiments described later. Furthermore, since the humidity control apparatus 30 is similar to that in Embodiment 1, description for the arrangement of sensors on the air flow passage side, description for an operation on an air circuit side, a system control method, and the like in the humidity control apparatus 30 will be omitted. Regarding this point, the same applies to the embodiments described later.

Refrigerant Circuit Configuration

FIG. 11 is refrigerant circuit diagram of the air-conditioning system according to Embodiment 2 of the present invention.

An inverter-driven capacity-variable compressor 11, a four-way valve 13 for switching between cooling and heating, an outdoor heat exchanger 12, and an accumulator 14 are provided within the outdoor unit 10a. An expansion valve 21 whose valve opening degree can be pulse-controlled using a stepping motor and an indoor heat exchanger 22 are provided in the outdoor unit 10a. The expansion valve 21 and the indoor heat exchanger 22 of the indoor unit 10b and the expansion valve 31 and the cooling device 32 of the humidity control apparatus 30 are connected in parallel to the outdoor unit 10a. The compressor 11, the four-way valve 13 for switching between cooling and heating, the outdoor heat exchanger 12, the expansion valves 21 and 31, the indoor heat exchangers 22 and 32, and the accumulator 14 are sequentially connected to configure a refrigerant circuit.

Refrigeration Cycle Operation

[Cooling Operation]

A cooling operation of a refrigeration cycle will be described with reference to FIG. 11. During a cooling operation, the four-way valve 13 is switched to a solid line side in FIG. 11.

A refrigerant that has been discharged from the compressor 11 flows from the four-way valve 13 to the outdoor heat exchanger 12 and is condensed and liquefied when exchanging heat with air. Subsequently the refrigerant branches through the liquid-side main pipe 102 into liquid-side branch pipes 104 and the flows of refrigerant flow into the expansion valves 21 and 31. Then, the flows of refrigerant that have flowed into the expansion valves 21 and 31 are decompressed by the expansion valves 21 and 31, flow to the indoor heat exchangers 22 and 32, exchange heat with air, and evaporate. The flows of refrigerant that have evaporated flow through a gas-side branch pipes 105 to the gas-side main pipe 103. The refrigerant then passes through the four-way valve 13 and the accumulator 14, and is sucked again into the compressor 11.

[Heating Operation]

A heating operation for a refrigeration cycle will be described with reference to FIG. 11. During a heating operation, the four-way valve 13 is switched to a dotted line side in FIG. 11.

A refrigerant that has been discharged from the compressor 11 flows from the four-way valve 13 through the gas-side main pipe 103, is branched into the gas-side branch pipes 105, and the flows of refrigerant flow into the indoor heat exchangers 22 and 32. The flows of refrigerant that have flowed into the indoor heat exchangers 22 and 32 are condensed and liquefied when exchanging heat with air, are decompressed by the expansion valves 21 and 31, and flow to the liquid-side main pipe 102. The low-pressure refrigerant flows through the outdoor heat exchanger 12, exchanges heat with air, and evaporates. Then, the refrigerant passes through the four-way valve 13 and the accumulator 14 and is sucked again into the compressor 11.

A refrigerant used in the refrigerant circuit is not limited. Various types of refrigerant may be used including (1) a natural refrigerant such as carbon dioxide, hydrocarbon, or helium, (2) a refrigerant that does not contain chlorine such as HFC410A or HFC407C, (3) a fluorocarbon refrigerant such as R22 or R134a that is used in existing products, and the like. Furthermore, regarding a fluid machinery such as a compressor that circulates such a refrigerant, various types including a reciprocal, rotary, scroll, or screw type may be applicable.

An outdoor air-sending device 15 and indoor air-sending devices 23 and 35 are capable of controlling the airflow, for example, capable of setting the airflow in accordance with conditions of air. The airflow control may be implemented by changing the rotation speed using a DC motor as a motor which rotates a fan or changing the rotation speed by changing the power supply frequency under inverter control using an AC motor. The air flow control is performed by the controller 40A.

System Components

The outdoor unit 10a includes the outdoor air-sending device 15 (see FIG. 12 which will be described later) that allows air to pass through the outdoor heat exchanger 12. The outdoor unit 10a also includes a discharge pressure sensor 1a on the discharge side of the compressor 11, a suction pressure sensor 1b on the suction side, and an outside air temperature sensor 2c on the air inlet side of the outdoor heat exchanger 12. The outdoor unit 10a also includes an outdoor unit control board 16 that acquires sensor information from individual sensors arranged on the outdoor unit 10a and controls the rotation speed of the compressor 11 and the airflow of the outdoor air-sending device 15 on the basis of the acquired information. Furthermore, the controller 40A is connected to the outdoor unit control board 16, so that the outdoor unit control board 16 receives an operation control signal regarding, for example, start of a cooling operation, from the controller 40A.

The indoor unit 10b includes an indoor air-sending device (not illustrated) that allows air to pass through the indoor heat exchanger 22. The indoor unit 10b takes in air from the room, causes the air to pass through the indoor heat exchanger 22 so that temperature control is performed, and sends the air into the room. The indoor unit 10b also includes a liquid pipe temperature sensor 2a, a gas pipe temperature sensor 2b, and an inlet air temperature sensor 2d that detects the temperature on the air inlet side of the indoor heat exchanger 22. The indoor unit 10b also includes an indoor unit control board 24 that acquires sensor information from individual sensors arranged on the indoor unit 10b and performs control of the expansion valve 21 and the like on the basis of the acquired information. Furthermore, the controller 40A is connected to the indoor unit control board 24, so that the indoor unit control board 24 receives an operation control signal regarding, for example, start of a cooling operation, from the controller 40A.

System Control Method

Figure 12:
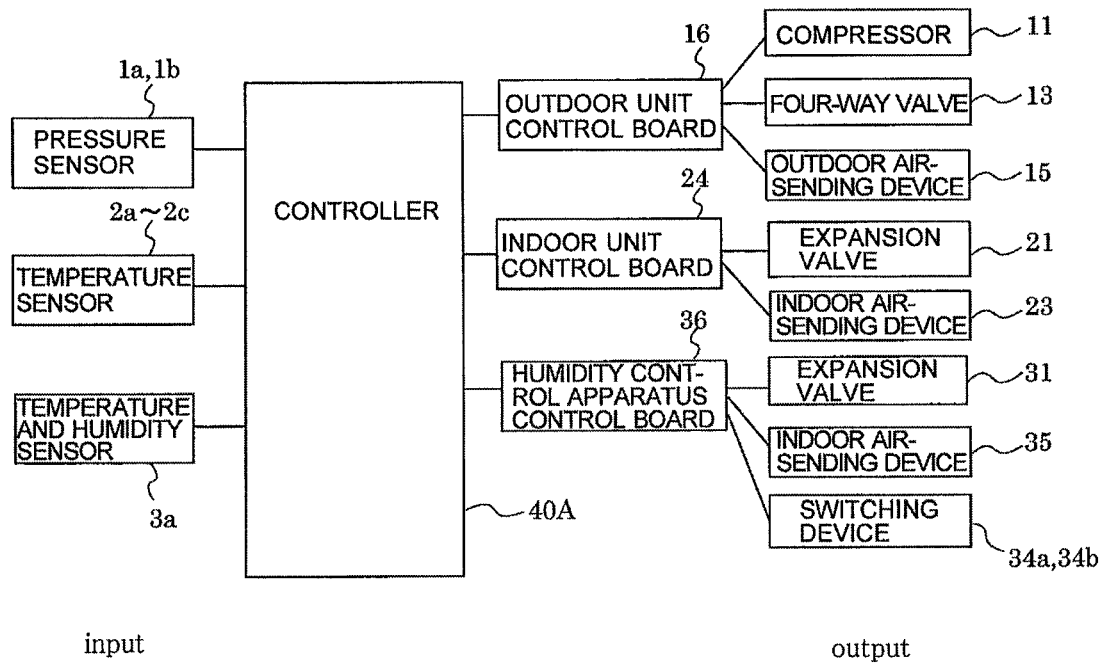
FIG. 12 is a control block diagram of the air-conditioning system according to Embodiment 2 of the present invention.

FIG. 12 is a control block diagram of the air-conditioning system according to Embodiment 2 of the present invention.

The air-conditioning system 100 receives a setting operation for temperature and humidity. Furthermore, the air-conditioning system 100 includes the controller 40A that performs various types of control, and the pressure sensors 1a and 1b, the temperature sensors 2a and 2b, and the temperature and humidity sensor 3a are connected to the controller 40A. In a sense, the controller 40A is configured as a device that includes the controller 40 according to Embodiment 1 built therein and that controls the entire air-conditioning system 100. The controller 40A is configured to be capable of issuing an instruction for a heating or cooling operation for the indoor unit 10b or the like. The controller 40A acquires sensor information from these sensors, and controls operation of the compressor 11, the expansion valves 21 and 31, the outdoor air-sending device 15, the indoor air-sending devices 23 and 35, and the switching devices 34a and 34b by transmitting control signals to the outdoor unit control board 16, the indoor unit control board 24, and the humidity control apparatus control board 36.

Operation Efficiency

Figure 13:
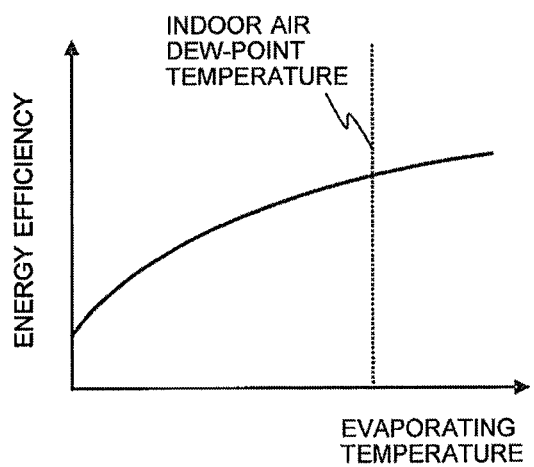
FIG. 13 is a diagram illustrating the relationship between evaporating temperature and energy efficiency.

FIG. 13 is a diagram illustrating the relationship between evaporating temperature and energy efficiency.

As is clear from FIG. 13, in order to operate a refrigeration cycle with a high energy efficiency, the evaporating temperature has only to be increased. Even after the evaporating temperature exceeds the indoor air dew-point temperature, an operation with a high energy efficiency can still be performed.

Figure 14:
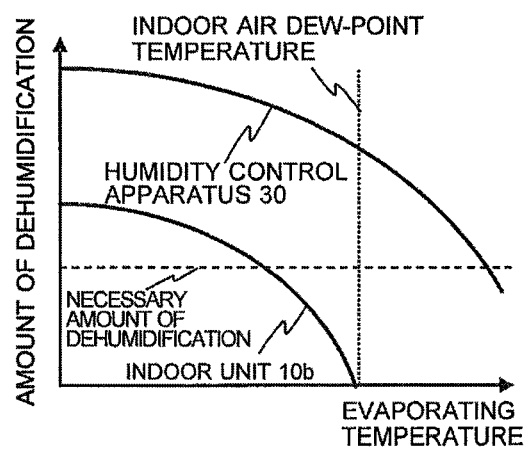
FIG. 14 is a diagram for explaining the relationship between the evaporating temperature and the amount of dehumidification in each of the case where a humidity control apparatus performs dehumidification and the case where an indoor unit performs dehumidification.
Figure 15:
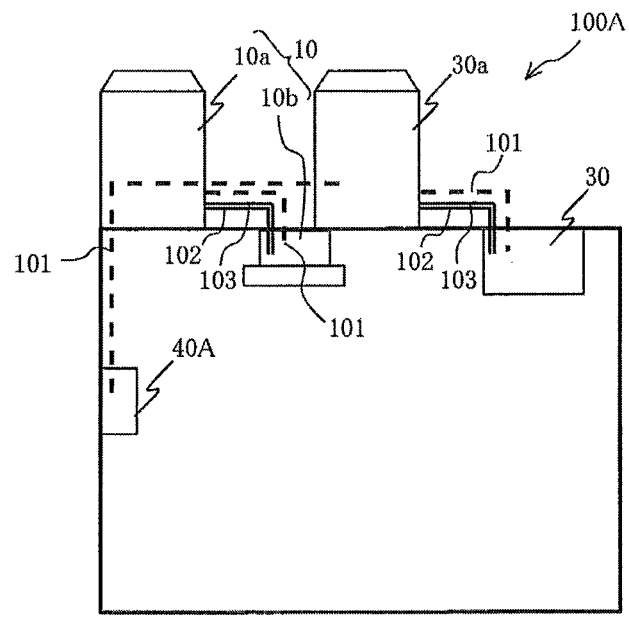
FIG. 15 is a diagram illustrating a configuration of an air-conditioning system according to Embodiment 3 of the present invention.

FIG. 14 is a diagram for explaining the relationship between evaporating temperature and the amount of dehumidification in each of the case where a humidity control apparatus performs dehumidification and the case where an indoor unit performs dehumidification. In FIG. 15, the horizontal axis represents evaporating temperature and the vertical axis represents the amount of dehumidification.

As is clear from FIG. 15, the amount of dehumidification of each of the indoor unit 10b and the humidity control apparatus 30 reduces as the evaporating temperature increases. However, the amount of dehumidification of the indoor unit 10b becomes zero when the evaporating temperature exceeds the dew-point temperature; whereas, the amount of dehumidification of the humidity control apparatus 30 does not immediately become zero even when the evaporating temperature exceeds the dew-point temperature, thus a necessary amount of dehumidification is ensured. Accordingly, since a necessary amount of dehumidification can be ensured even when the evaporating temperature is set to be higher than the indoor air dew-point temperature in the humidity control apparatus 30, it can be understood that performing dehumidification with the humidity control apparatus 30 is more efficient than ensuring a necessary amount of dehumidification by the indoor unit 10b.

The air-conditioning system 100 configured as described above can achieve the effects similar to those in Embodiment 1. In addition, since dehumidification is performed with the humidity control apparatus 30, the indoor unit 10b for sensible heat processing does not need to perform dehumidification. Therefore, compared to the case where dehumidification is performed with the indoor unit 10b, an operation for increasing the evaporating temperature can be performed. Consequently, the efficiency of the entire system can be enhanced, and the power consumption can be reduced. Furthermore, with the use of a humidity control apparatus that is capable of dehumidifying with the use of a refrigerant with a high evaporating temperature, temperature control and humidity control can be performed efficiently, regardless of whether a load source is indoor or outdoor.

Furthermore, since the humidity control apparatus 30 is connected to the outdoor unit 10a and is arranged inside the room, the compressor 11 does not need to be mounted within the humidity control apparatus 30, thus a weight reduction of the humidity control apparatus 30 becomes achievable.

Furthermore, the humidity control apparatus 30 does not include a desorption heat source, such as a heating device, for desorbing moisture from the moisture adsorption/desorption devices 33a and 33b. Therefore, connection similar to that for existing indoor units can be achieved, and an indoor unit of an existing air-conditioning system can be replaced with the humidity control apparatus 30.

In the case where a plurality of indoor units 10b are connected to the outdoor unit 10a, by changing the balance between the number of installed indoor units 10b and the number of installed humidity control apparatuses 30, the dehumidification capacity may be changed according to the environment.

Embodiment 3

Similar to the air-conditioning system 100 according to Embodiment 2, an air-conditioning system according to Embodiment 3 includes the outdoor unit 10a, the indoor unit 10b, the humidity control apparatus 30, and the controller 40A. The air-conditioning system according to Embodiment 3 and the air-conditioning system 100 according to Embodiment 2 are similar to each other in that air conditioning for the same space is performed with the indoor unit 10b and the humidity control apparatus 30 and are different from each other in the points described below. That is, they are different in that the outdoor unit 10a, the indoor unit 10b, and the humidity control apparatus 30 are connected by a refrigerant circuit in Embodiment 2, whereas the indoor unit 10b and the humidity control apparatus 30 configure individual refrigerant circuits in Embodiment 3. In addition, an evaporator of the refrigerant circuit on the humidity control apparatus 30 side forms the cooling device 32. Hereinafter, parts of Embodiment 3 that are different from Embodiment 2 will be mainly described.

FIG. 15 is a diagram illustrating a configuration of the air-conditioning system according to Embodiment 3 of the present invention.

In an air-conditioning system 100A, the indoor unit 10b is connected to the outdoor unit 10a to configure an air-conditioning apparatus 10. The humidity control apparatus 30 is connected to an outdoor unit 30a. The outdoor unit 10a and the indoor unit 10b are connected by pipes of a liquid-side main pipe 102 and a gas-side main pipe 103 and a transmission line 101. Furthermore, the outdoor unit 30a and the humidity control apparatus 30 are connected by pipes of a liquid-side main pipe 102 and a gas-side main pipe 103 and a transmission line 101 that are different from those on the air-conditioning apparatus 10 side. The controller 40A is connected to each of the outdoor unit 10a and the outdoor unit 30a by the transmission line 101.

Illustrations of the refrigerant circuits of the humidity control apparatus 30 and the air-conditioning apparatus 10 will be omitted. The refrigerant circuits each have a configuration in which a compressor, a four-way valve (only on the air-conditioning apparatus 10 side), a heat-source-side heat exchanger, an expansion valve, and a use-side heat exchanger are sequentially connected by pipes. Furthermore, compared to a compressor arranged in the outdoor unit 10a in Embodiment 2 in which the entire system is configured as a single refrigerant circuit, compressors provided in the outdoor unit 10a and the outdoor unit 30a each having a smaller compressor capacity can be used. Therefore, input power for reducing the evaporating temperature by the same temperature may be reduced compared to that for the case of the outdoor unit 10a side in Embodiment 2.

In the air-conditioning system 100A according to Embodiment 3 configured as described above, effects similar to those in Embodiment 1 and Embodiment 2 can be achieved. In addition, since refrigerant circuits of the humidity control apparatus 30 and the indoor unit 10b are individually provided, the evaporating temperature of the refrigerant circuit on the humidity control apparatus 30 side and the evaporating temperature of the refrigerant circuit on the indoor unit 10b side can be individually set. Therefore, since in the refrigerant circuit on the indoor unit 10b side for sensible heat processing, the evaporating temperature can be set only in order to control temperature, compared to the configuration of Embodiment 2 in which the humidity control apparatus 30 and the indoor unit 10b form the same refrigerant circuit, the evaporating temperature can further be increased. Therefore, an increase in the efficiency of the entire air-conditioning system can be achieved.

Furthermore, in the case where a large amount of latent heat load is generated inside the room, by reducing the evaporating temperature of the refrigerant circuit on the humidity control apparatus 30 side to increase the amount of dehumidification and increasing the evaporating temperature of the refrigerant circuit on the indoor unit 10b side so that sensible heat processing can be efficiently performed, the air-conditioning load can be processed with high efficiency while maintaining the comfort. Therefore, in the air-conditioning system 100A, a high-efficiency operation can be secured, regardless of the load state.

Embodiment 4

An air-conditioning system according to Embodiment 4 is a system configured in such a manner that an outside air processing device is further connected to the air-conditioning system 100 according to Embodiment 2 illustrated in FIG. 10 and the humidity control apparatus 30, the indoor unit 10b, and the outside air processing device perform air conditioning for the same space. Hereinafter, parts of Embodiment 4 that are different from Embodiment 2 will be mainly described.

Figure 16:
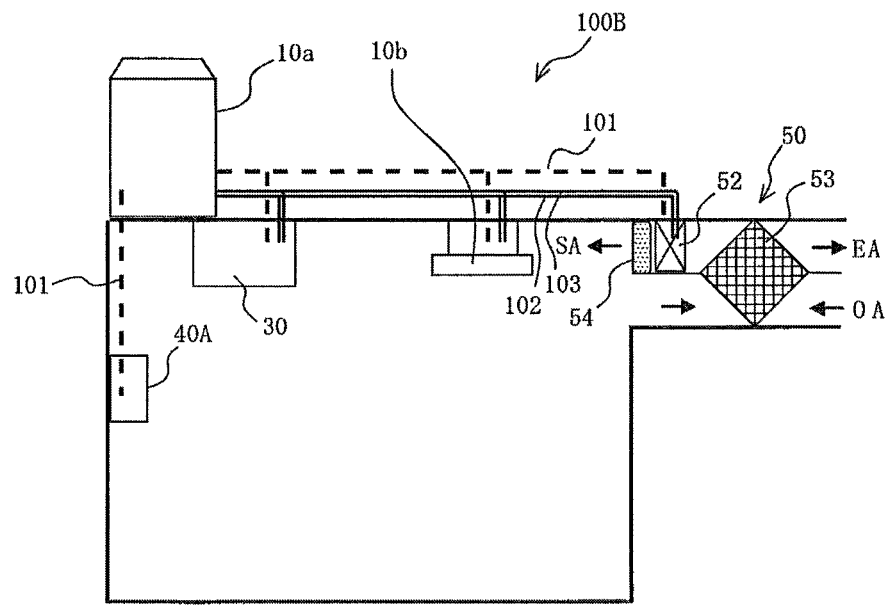
FIG. 16 is a diagram illustrating a configuration of an air-conditioning system according to Embodiment 4 of the present invention.

FIG. 16 is a diagram illustrating a configuration of the air-conditioning system according to Embodiment 4 of the present invention.

An air-conditioning system 100B is configured to further include an outside air processing device 50 for outside air processing, in addition to the indoor unit 10b for sensible heat processing and the humidity control apparatus 30 for latent heat processing.

The outside air processing device 50 is a device that controls the temperature and humidity of outside air taken from outside the room and then supplies the controlled air into the room. The outside air processing device 50 includes an expansion valve (not illustrated) whose valve opening degree can be pulse-controlled using a stepping motor, an indoor heat exchanger 52, a total heat exchanger 53, a humidifying device 54, an air-sending device for air supply (not illustrated), an air-sending device for air discharge (not illustrated), and an external processing control board (not illustrated).

The total heat exchanger 53 is a heat exchanger that performs total heat exchange between outside air OA and indoor return air RA. Similar to the indoor unit 10b, the refrigerant circuit of the outside air processing device 50 is configured such that an expansion valve (not illustrated) of the outside air processing device 50 and the indoor heat exchanger 52 are connected through branch pipes to the liquid-side main pipe 102 and the gas-side main pipe 103 that extend from the outdoor unit 10a and that the expansion valve and the indoor heat exchanger 52 are connected in parallel to the outdoor unit 10a. Furthermore, the outside air processing device 50 and the outdoor unit 10a are connected through the transmission line 101. Although the number of the connected outside air processing devices 50 is one in FIG. 16, the number of the connected outside air processing devices 50 is not limited to one. Two or more outside air processing devices 50 may be connected.

Inside the outside air processing device 50, the outside air OA passes through the total heat exchanger 53, the indoor heat exchanger 52, and the humidifying device 54 in that order, and is supplied as supply air SA into the room. Inside the outside air processing device 50, the indoor return air RA passes through the total heat exchanger 53, and is discharged as exhaust air EA outside the room. Since the total heat exchanger 53 performs total heat exchange between the outside air OA and the indoor return air RA, compared to the case where outside air is directly supplied into the room for the purpose of ventilation, the load generated inside the room can be reduced. Therefore, input to the compressor 11 (see FIG. 11) of the outdoor unit 10a may be reduced.

In the air-conditioning system 100B according to Embodiment 4, operation effects similar to those in Embodiment 1 and Embodiment 2 can be achieved. In addition, by providing the outside air processing device 50, compared to the case where outside air is directly introduced into the room without providing the outside air processing device 50, input to the compressor 11 of the outdoor unit 10a may be reduced.

Furthermore, in the case where the temperature and the humidity of outside air are higher than those of indoor air (it is assumed that the outdoor unit 10a performs a cooling operation), the outside air after passing through the total heat exchanger 53 exhibits temperature and humidity higher than the indoor air. Therefore, the difference between the evaporating temperature and the passing air temperature of a refrigerant flowing in the indoor heat exchanger 52 of the outside air processing device 50 increases compared to the difference between the evaporating temperature and the indoor air temperature in the indoor heat exchanger 22 of the indoor unit 10b. The indoor heat exchanger 52 is capable of performing heat processing with efficiency higher than the indoor heat exchanger 22.

Furthermore, in the case where the temperature and the humidity of the outside air are lower than the indoor air (it is assumed that the outdoor unit 10a performs a heating operation), the outside air after passing through the total heat exchanger 53 exhibits temperature and humidity lower than the indoor air. Therefore, the difference between the condensing temperature and the passing air temperature of a refrigerant flowing through the indoor heat exchanger 52 in the outside air processing device 50 increases compared to the difference between the evaporating temperature and the indoor air temperature in the indoor heat exchanger 22 of the indoor unit 10b. The indoor heat exchanger 52 is capable of performing heat processing with efficiency higher than the indoor heat exchanger 22.

In the case where a heating and humidifying operation is performed in winter, by using the humidifying device 54, the room can be humidified. As the humidifying device 54, a device using a moisture permeable membrane of a water supply type, such as an ultrasonic humidifier or the like, may be used.

Since no compressor is mounted on the outside air processing device 50, there is no need to mount a compressor on all the devices (the indoor unit 10b, the humidity control apparatus 30, and the outside air processing device 50) arranged in a space above the ceiling, thus reductions in the weight and size being achieved. Therefore, the workload in installing the air-conditioning system 100B can be reduced.

Furthermore, a sensor that detects the temperature and the humidity of outside air is arranged in the outside air processing device 50 so that outside air information is acquired from the outside air processing device 50. In the case where the outside air has a load lower than indoor air, by causing the outside air processing device 50 to perform the indoor load processing and stopping the humidity control apparatus 30 and the indoor unit 10b, energy saving can be achieved.

Embodiment 5

An air-conditioning system 100C according to Embodiment 5 and the air-conditioning system according to Embodiment 4 are similar to each other in that air conditioning for the same space is performed by the humidity control apparatus 30, the indoor unit 10b, and the outside air processing device 50, and they are different in the points described below. In the air-conditioning system 100C, the humidity control apparatus 30 in the air-conditioning system 100B according to Embodiment 4 illustrated in FIG. 16 is configured as an independent refrigerant circuit different from that on the indoor unit 10b and the outside air processing device 50 side. Hereinafter, parts of Embodiment 5 that are different from Embodiment 4 will be mainly described.

Figure 17:
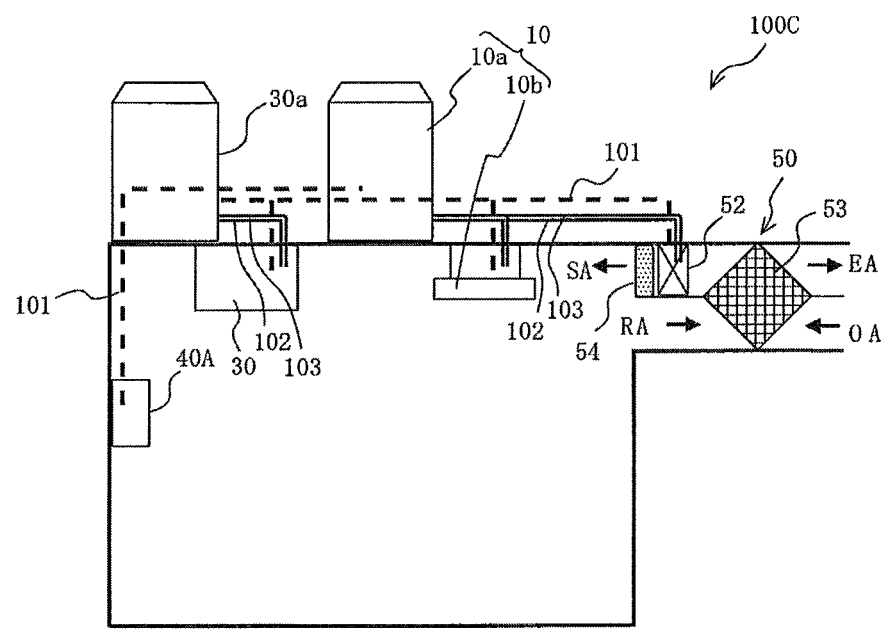
FIG. 17 is a diagram illustrating a configuration of an air-conditioning system according to Embodiment 5 of the present invention.

FIG. 17 is a diagram illustrating a configuration of the air-conditioning system according to Embodiment 5 of the present invention.

In the air-conditioning system 100C, the air-conditioning apparatus 10 is configured by connecting the indoor unit 10b to the outdoor unit 10a, and the outside air processing device 50 is further connected to the air-conditioning apparatus 10. In addition, the humidity control apparatus 30 is connected to the outdoor unit 30a to form an independent refrigerant circuit different from that of the air-conditioning apparatus 10. The outdoor unit 10a and the indoor unit 10b are connected through pipes of the liquid-side main pipe 102 and the gas-side main pipe 103 and the transmission line 101.

Furthermore, compared to the compressor arranged in the outdoor unit 10a in Embodiment 2 in which the entire system is configured as a single refrigerant circuit, compressors arranged in the outdoor unit 10a and the outdoor unit 30a may each have a smaller compressor capacity. Therefore, input power for reducing the evaporating temperature by the same temperature may be reduced compared to that for the case of the outdoor unit 10a side in Embodiment 2. Furthermore, since the outside air processing device 50 is similar to the outside air processing device 50 in Embodiment 4, description for the configuration, operation, and the like will be omitted.

In the air-conditioning system 100C according to Embodiment 5, operation effects similar to those in Embodiments 1 to 4 can be achieved, and further effects can be achieved as described below. That is, since a refrigerant circuit to which the indoor unit 10b and the outside air processing device 50 are connected and a refrigerant circuit on the side of the humidity control apparatus 30 for latent heat processing are separated from each other, there is no need to perform dehumidification on the air-conditioning apparatus 10 side. Therefore, the air-conditioning apparatus 10 side only needs to control temperature, and an operation for further increasing the evaporating temperature can be performed, thus a reduction in the power consumption being achieved.

The invention claimed is:

1. A humidity control apparatus comprising:
a main body including an air inlet into which air from a dehumidification target space is taken and an air outlet through which air is supplied to the dehumidification target space;
an air path arranged within the main body and configured to connect the air inlet and the air outlet;
a first moisture adsorption/desorption device arranged within the air path and configured to transfer moisture to air having a relatively low humidity and receive moisture from air having a relatively high humidity;
a second moisture adsorption/desorption device arranged within the air path so as to be separated from the first moisture adsorption/desorption device and configured to transfer moisture to air having the relatively low humidity;
a cooling device arranged between the first moisture adsorption/desorption device and the second moisture adsorption/desorption device and configured to cool air that has been humidified by moisture transfer by the first moisture adsorption/desorption device or the second moisture adsorption/desorption device;
switching devices arranged within the air path and configured to alternately switch between a first air route and a second air route, the first air route being a route through which the air taken through the air inlet passes in order of the first moisture adsorption/desorption device, the cooling device, and the second moisture adsorption/desorption device, the second air route being a route through which the air taken through the air inlet passes in order of the second moisture adsorption/desorption device, the cooling device, and the first moisture adsorption/desorption device in that order; and
a controller configured to set, every time the air routes are switched to the first air route or the second air route, a route maintenance time for the switched air route on the basis of a heat load within the dehumidification target space, and control switching of the switching devices such that the set route maintenance time is ensured,
wherein the controller sets
on the basis of the heat load within the dehumidification target space, a preset default time as the route maintenance time in a case where an amount of a processing for the latent heat load increases, and
on the basis of the heat load within the dehumidification target space, a time extended from the default time as the route maintenance time in a case where an amount of a processing for the sensible heat load increases.

2. The humidity control apparatus of claim 1,
wherein in a case where the processing for the sensible heat load continues, the controller every time determines the time extended from the last route maintenance time to be a current route maintenance time.

3. The humidity control apparatus of claim 1,
wherein the controller sets
a time shorter than the route maintenance time for the last switching operation as the current route maintenance time in a case where the processing for the latent heat load is performed, and
a time longer than the route maintenance time for the last switching operation as the current route maintenance time in a case where the processing for the sensible heat load is performed.

4. The humidity control apparatus of claim 1,
wherein the controller increases the amount of the processing for the sensible heat load in a case where an indoor temperature is equal to or higher than a set temperature or the indoor temperature is higher than the set temperature by a specific degree or more, and
the amount of the processing for the latent heat load in a case where the indoor temperature is lower than the set temperature or the indoor temperature is lower than a temperature that is higher than the set temperature by a specific degree.

5. The humidity control apparatus of claim 1,
wherein the first moisture adsorption/desorption device and the second moisture adsorption/desorption device are fixed within the air path and maintained stationary.

6. The humidity control apparatus of claim 1,
wherein the first moisture adsorption/desorption device and the second moisture adsorption/desorption device are air-permeable units including a large number of small through holes.

7. The humidity control apparatus of claim 1,
wherein the first moisture adsorption/desorption device and the second moisture adsorption/desorption device are arranged in such a manner that an air passage surface of the first moisture adsorption/desorption device and an air passage surface of the second moisture adsorption/desorption device face an air passage surface of the cooling device.

8. The humidity control apparatus of claim 1,
wherein the first moisture adsorption/desorption device, the the cooling device, and the second moisture adsorption/desorption device are arranged in such a manner that a passing direction of air passing through the first moisture adsorption/desorption device, the cooling device, and the second moisture adsorption/desorption device is inverted by switching of a route of the air.

9. The humidity control apparatus of claim 1,
wherein the air path includes a first branch part that is arranged on an upstream side of the first moisture adsorption/desorption device and the second moisture adsorption/desorption device and that diverges a route into two directions and a second branch part that is arranged on a downstream side of the first moisture adsorption/desorption device and the second moisture adsorption/desorption device and that diverges a route into two directions, and
wherein the switching devices are arranged at each of the first branch part and the second branch part.

10. The humidity control apparatus of claim 1,
wherein the cooling device is an evaporator of a refrigeration cycle.

11. An air-conditioning system comprising:
a refrigerant circuit configured to perform a refrigeration cycle by circulating a refrigerant between one or more indoor units arranged in the dehumidification target space and an outdoor unit; and
the one or more humidity control apparatuses of claim 1, wherein the cooling device of the humidity control apparatus is used as an evaporator connected in parallel to the outdoor unit of the refrigerant circuit.

12. An air-conditioning system comprising:
a first refrigerant circuit configured to perform refrigeration cycle by circulating a refrigerant between one or more indoor units that perform temperature control for the dehumidification target space and an outdoor unit;
a second refrigerant circuit that is separated from the first refrigerant circuit; and
the one or more humidity control apparatuses of claim 1 including, as the cooling device, a heat exchanger functioning as an evaporator in the second refrigerant circuit.

13. The air-conditioning system of claim 11, further comprising
one or more outside air processing devices configured to control temperature and humidity of outside air taken from outside and then supply the controlled air to the dehumidification target space,
wherein air conditioning for a same space is performed by the one or more outside air processing devices, the humidity control apparatus, and the indoor units.

14. The air-conditioning system of claim 11, further comprising
one or more outside air processing devices configured to control temperature and humidity of outside air taken from outside and then supply the controlled air to the dehumidification target space,
wherein the one or more outside air processing devices each include
a first air flow passage forming a flow of air travelling from the outside toward an indoor space,
a second air flow passage forming a flow of air travelling from the indoor space toward the outside,
a total heat exchanger configured to perform total heat exchange between the air flowing through the first air flow passage and the air flowing through the second air flow passage, and
a heat exchanger arranged downstream of the total heat exchanger in the first air flow passage and that is connected in parallel to the outdoor unit of the refrigerant circuit.

15. The air-conditioning system of claim 12, comprising:
one or more outside air processing devices configured to control temperature and humidity of outside air taken from outside and then supply the controlled air to the dehumidification target space,
wherein the one or more outside air processing devices each include
a first air flow passage forming a flow of air travelling from the outside toward an indoor space,
a second air flow passage forming a flow of air travelling from the indoor space toward the outside,
a total heat exchanger configured to perform total heat exchange between the air flowing through the first air flow passage and the air flowing through the second air flow passage, and
a heat exchanger that is arranged downstream the total heat exchanger in the first air flow passage and that is connected in parallel to the outdoor unit of the first refrigerant circuit.

16. A method for controlling a humidity control apparatus including
a main body including an air inlet into which air from a dehumidification target space is taken and an air outlet through which air is supplied to the dehumidification target space,
an air path arranged within the main body and configured to connect the air inlet and the air outlet,
a first moisture adsorption/desorption device arranged within the air path and configured to transfer moisture to air having a relatively low humidity and receive moisture from air having a relatively high humidity,
a second moisture adsorption/desorption device arranged within the air path so as to be separated from the first moisture adsorption/desorption device and configured to transfer moisture to air having the relatively low humidity,
a cooling device arranged between the first moisture adsorption/desorption device and the second moisture adsorption/desorption device and configured to cool air that has been humidified by moisture transfer by the first moisture adsorption/desorption device or the second moisture adsorption/desorption device, and
switching devices arranged within the air path and configured to alternately switch between a first air route and a second air route, the first air route being a route through which the air taken through the air inlet passes in order of the first moisture adsorption/desorption device, the cooling device, and the second moisture adsorption/desorption device, the second air route being a route through which the air taken through the air inlet passes in order of the second moisture adsorption/desorption device, the cooling device, and the first moisture adsorption/desorption device, the method comprising the steps of:
setting, every time the air routes are switched to the first air route or the second air route, a route maintenance time for the switched air route on the basis of a heat load within the dehumidification target space to following (A) or (B),
(A) being a setting to set, on the basis of the heat load within the dehumidification target space, a preset default time as the route maintenance time in a case where an amount of a processing for the latent heat load increases, and
(B) being a setting to set, on the basis of the heat load within the dehumidification target space, a time extended from the default time as the route maintenance time in a case where an amount of a processing for the sensible heat load increases; and
controlling switching of the switching devices such that the set route maintenance time is ensured.

* * * * *